US012581483B2

(12) United States Patent
Liu et al.

(10) Patent No.: US 12,581,483 B2
(45) Date of Patent: Mar. 17, 2026

(54) TERMINAL APPARATUS, BASE STATION APPARATUS, AND COMMUNICATION METHOD FOR FLEXIBLE PHYSICAL DOWNLINK CONTROL CHANNEL (PDCCH) REPETITIONS

(71) Applicant: SHARP KABUSHIKI KAISHA, Sakai City (JP)

(72) Inventors: Liqing Liu, Sakai City (JP); Shohei Yamada, Sakai City (JP); Hiroki Takahashi, Sakai City (JP); Meng Cheng, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 442 days.

(21) Appl. No.: 18/030,066

(22) PCT Filed: Oct. 5, 2021

(86) PCT No.: PCT/JP2021/037496
§ 371 (c)(1),
(2) Date: Apr. 3, 2023

(87) PCT Pub. No.: WO2022/075483
PCT Pub. Date: Apr. 14, 2022

(65) Prior Publication Data
US 2023/0371022 A1    Nov. 16, 2023

(30) Foreign Application Priority Data
Oct. 9, 2020    (JP) ................................. 2020-171062

(51) Int. Cl.
*H04W 72/23*       (2023.01)
*H04W 72/1268*     (2023.01)
*H04W 72/232*      (2023.01)
*H04W 76/20*       (2018.01)

(52) U.S. Cl.
CPC ..... *H04W 72/1268* (2013.01); *H04W 72/232* (2023.01); *H04W 76/20* (2018.02)

(58) Field of Classification Search
CPC ........... H04W 72/1268; H04W 72/232; H04W 72/231; H04W 76/20; H04W 72/126; H04W 72/23; H04L 5/0048; H04L 5/0094
See application file for complete search history.

(56) References Cited

U.S. PATENT DOCUMENTS

| | | | | |
|---|---|---|---|---|
| 11,071,172 B2 * | 7/2021 | He | ..................... | H04W 52/0251 |
| 2020/0396744 A1 * | 12/2020 | Xiong | ................. | H04L 27/2636 |
| 2021/0051669 A1 * | 2/2021 | Lin | ........................ | H04W 72/53 |

OTHER PUBLICATIONS

Huawei et al., "PUSCH enhancements for URLLC", R1-1910068, 3GPP TSG RAN WG1 Meeting #98bis Chongqing, China, Oct. 14-20, 2019.

* cited by examiner

*Primary Examiner* — Wei Zhao
(74) *Attorney, Agent, or Firm* — ScienBiziP, P.C.

(57) ABSTRACT

A user equipment (UE) is described. The UE includes reception circuitry configured to receive, from a base station, PDCCH with a first DCI format scheduling PUSCH repetitions, and a RRC parameter indicating slot format per slot, and control circuitry configured to determine, based on the first DCI format and the RRC parameter, multiple PUSCH transmission occasions with a first number for transmission of the PUSCH repetitions, wherein in a case that one or more symbols of a PUSCH transmission occasion in a slot overlap with one or more symbols indicated as downlink symbol by the RRC parameter, the PUSCH transmission occasion is not included in the multiple PUSCH transmission occasions for transmission of the PUSCH repetitions, and transmission circuitry further configured to transmit the PUSCH repetitions in the multiple PUSCH transmission occasions.

5 Claims, 12 Drawing Sheets

| Slot format index | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| ... | | | | | | | ... | | | | | | | |
| 255 | UE determines the slot format for the slot based on higher layer slot format configuration information and , if any, on detected DCI formats | | | | | | | | | | | | | |

Figure 6:
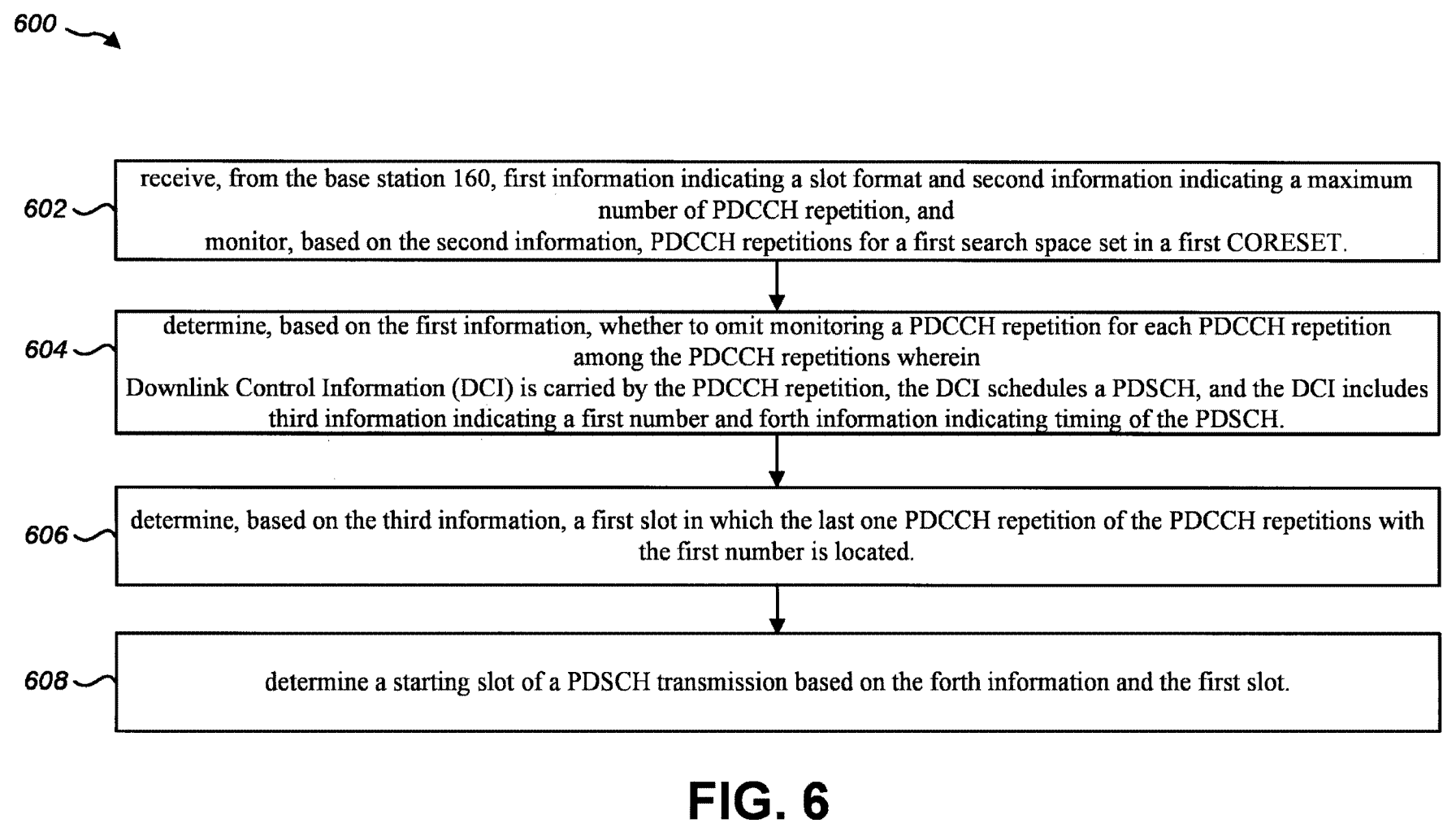

602 receive, from the base station 160, first information indicating a slot format and second information indicating a maximum number of PDCCH repetition, and monitor, based on the second information, PDCCH repetitions for a first search space set in a first CORESET.

604 determine, based on the first information, whether to omit monitoring a PDCCH repetition for each PDCCH repetition among the PDCCH repetitions wherein Downlink Control Information (DCI) is carried by the PDCCH repetition, the DCI schedules a PDSCH, and the DCI includes third information indicating a first number and forth information indicating timing of the PDSCH.

606 determine, based on the third information, a first slot in which the last one PDCCH repetition of the PDCCH repetitions with the first number is located.

608 determine a starting slot of a PDSCH transmission based on the forth information and the first slot.

| Maximum number of PDCCH repetition | '0' | '1' |
|---|---|---|
| X | X10 | X11 |
| Y | Y10 | Y11 |

(b)

| Maximum number of PDCCH repetition | '00' | '01' | '10' | '11' |
|---|---|---|---|---|
| X | X20 | X21 | X22 | X23 |
| Y | Y20 | Y21 | Y22 | Y23 |

Figure 9:
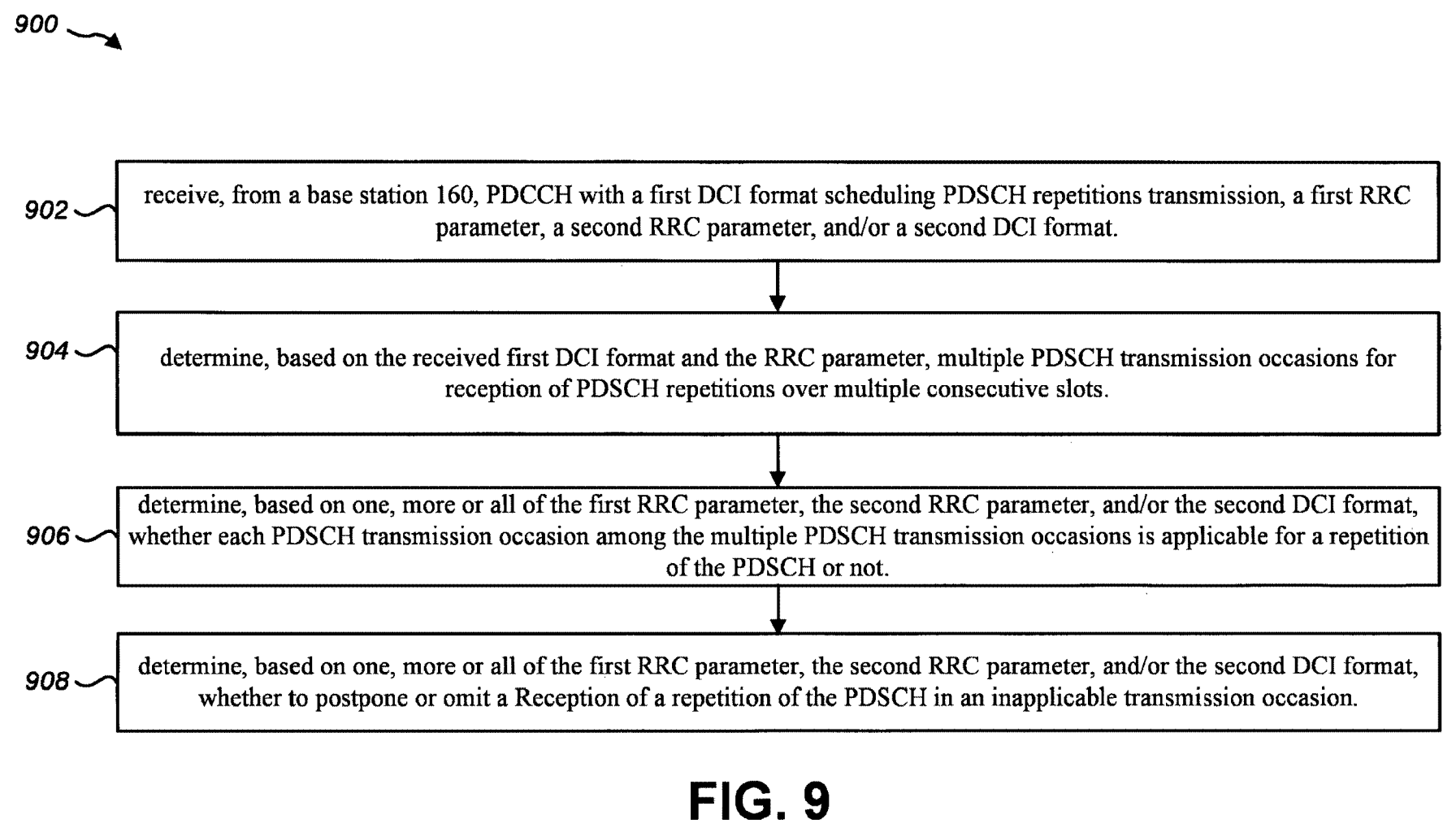

902   receive, from a base station 160, PDCCH with a first DCI format scheduling PDSCH repetitions transmission, a first RRC parameter, a second RRC parameter, and/or a second DCI format.

904   determine, based on the received first DCI format and the RRC parameter, multiple PDSCH transmission occasions for reception of PDSCH repetitions over multiple consecutive slots.

906   determine, based on one, more or all of the first RRC parameter, the second RRC parameter, and/or the second DCI format, whether each PDSCH transmission occasion among the multiple PDSCH transmission occasions is applicable for a repetition of the PDSCH or not.

908   determine, based on one, more or all of the first RRC parameter, the second RRC parameter, and/or the second DCI format, whether to postpone or omit a Reception of a repetition of the PDSCH in an inapplicable transmission occasion.

1002 — receive, from a base station 160, PDCCH with a first DCI format scheduling PDSCH repetitions transmission, a first RRC parameter, a second RRC parameter, and/or a second DCI format.

1004 — determine, based on one, more or all of the received first DCI format, the first RRC parameter, and/or the second RRC parameter, multiple PDSCH transmission occasions for reception of PDSCH repetitions over multiple consecutive slots, and whether to include a PDSCH transmission occasions as the multiple PDSCH transmission occasions.

1006 — determine, based on the second DCI format, whether to transmit or omit a reception of a repetition of the PDSCH in an PDSCH transmission occasion among the multiple PDSCH transmission occasions.

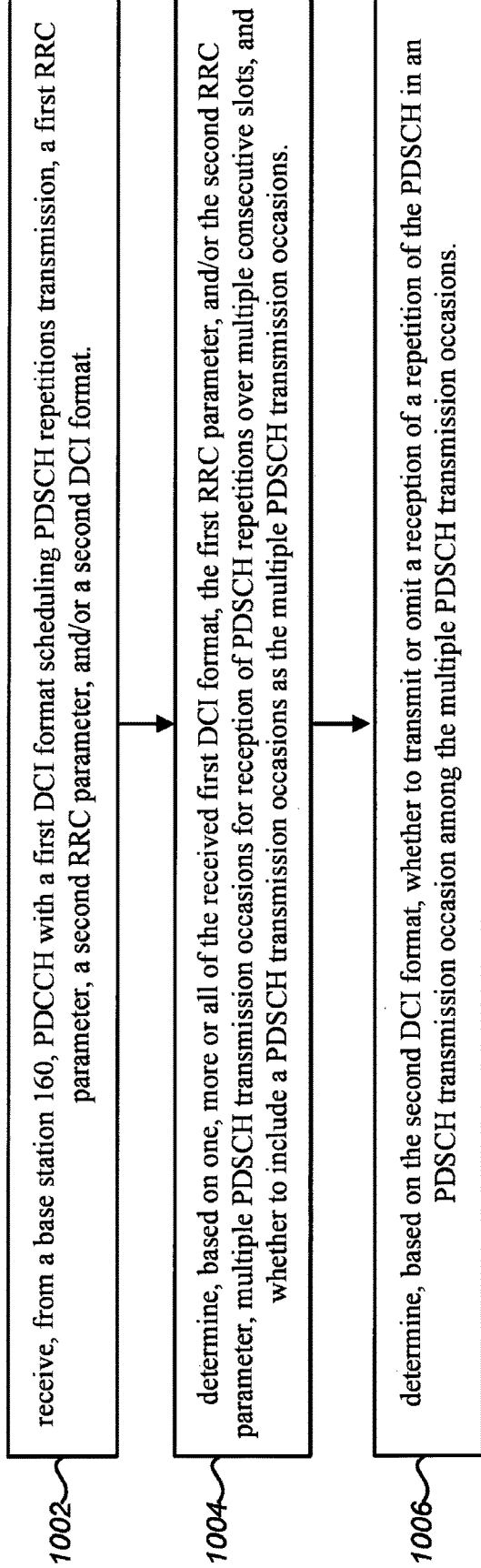

FIG. 10

TERMINAL APPARATUS, BASE STATION APPARATUS, AND COMMUNICATION METHOD FOR FLEXIBLE PHYSICAL DOWNLINK CONTROL CHANNEL (PDCCH) REPETITIONS

TECHNICAL FIELD

The present disclosure relates to a terminal apparatus, a base station apparatus, a communication method, and an integrated circuit.

BACKGROUND ART

At present, as a radio access system and, a radio network technology aimed for the fifth generation cellular system, technical investigation and standard development are being conducted, as extended standards of Long Term Evolution (LTE), on LTE-Advanced Pro (LTE-A Pro) and New Radio technology (NR) in The Third Generation Partnership Project (3GPP).

In the fifth generation cellular system, three services of enhanced Mobile BroadBand (eMBB) to achieve high-speed and large-volume transmission, Ultra-Reliable and Low Latency Communication (URLLC) to achieve low-latency and high-reliability communication, and massive Machine Type Communication (mMTC) to allow connection of a large number of machine type devices such as Internet of Things (IoT) have been demanded as assumed scenarios.

For example, wireless communication devices may communicate with one or more devices for multiple service types. For some device types, a lower complexity would be required such as to reduce the Rx/Tx antennas and/or the RF bandwidth to reduce the UE complexity and the UE cost. However, given the reduced antennas and/or the bandwidth, the PDCCH/PDSCH channel coverage and the PDCCH/PDSCH reception reliability would be affected and cause an inefficient communication. As illustrated by this discussion, systems and methods according to the prevent invention, supporting flexible PDCCH repetition, may improve reception/transmission reliability and coverage, and provide the communication flexibility and efficiency.

BRIEF DESCRIPTION OF THE DRAWINGS

FIG. 4 is a diagram illustrating one example 400 of a slot format table.

FIG. 6 illustrates one example 600 for determining PDCCH repetition and PDSCH transmission by a UE 102;

FIG. 7 illustrates one example 700 of mapping of PDCCH repetition field values to a PDCCH repetition number corresponding to a maximum number of PDCCH repetition;

FIG. 9 is a flow diagram illustrating one implementation of a method 900 for determining PDSCH repetition by a UE 102.

FIG. 10 is a flow diagram illustrating another implementation of a method 1000 for determining PDSCH repetition by a UE 102.

DESCRIPTION OF EMBODIMENTS

Figure 1:
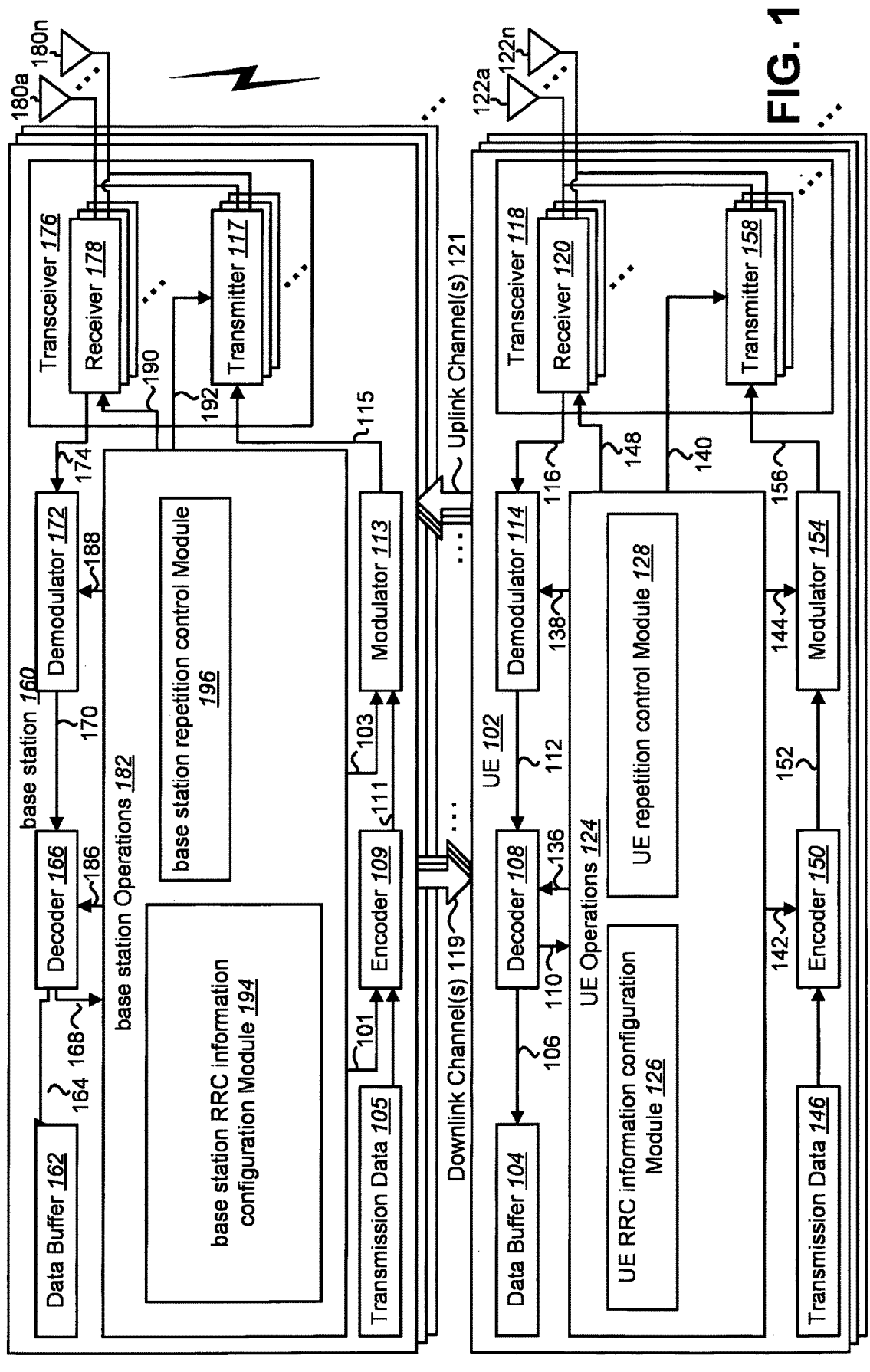
FIG. 1 is a block diagram illustrating one configuration of one or more base stations and one or more user equipments (UEs) in which systems and methods for determining the repetition transmission of a PDCCH and/or a PDSCH may be implemented.

A user equipment (UE) is described. The UE includes reception circuitry configured to receive, from a base station, PDCCH with a first DCI format scheduling PDSCH repetitions, and a RRC parameter indicating slot format per slot; control circuitry configured to determine, based on the first DCI format and the RRC parameter, multiple PDSCH transmission occasions for reception of the PDSCH repetitions, wherein in a case that one or more symbols of a PDSCH transmission occasion overlap with one or more symbols indicated as uplink symbol by the RRC parameter, the PDSCH transmission occasion is not included as the multiple PDSCH transmission occasions for reception of the PDSCH repetitions; and reception circuitry further configured to receive the PDSCH repetitions in the multiple PDSCH transmission occasions.

A base station is described. The base station includes control circuitry configured to determine, to a user equipment (UE), PDCCH with the first DCI format scheduling PDSCH repetitions, and a RRC parameter indicating slot format per slot; control circuitry configured to determine, to the UE, based on the first DCI format and the RRC parameter, multiple PDSCH transmission occasions for transmission of the PDSCH repetitions, wherein in a case that one or more symbols of a PDSCH transmission occasion overlap with one or more symbols indicated as uplink symbol by the RRC parameter, the PDSCH transmission occasion is not included as the multiple PDSCH transmission occasions for transmission of the PDSCH repetitions; and transmission circuitry further configured to transmit the PDSCH repetitions in the multiple PDSCH transmission occasions.

A method by a user equipment (UE) is described. The method of the UE includes receiving, from a base station, PDCCH with a first DCI format scheduling PDSCH repetitions, and a RRC parameter indicating slot format per slot; determining, based on the first DCI format and the RRC parameter, multiple PDSCH transmission occasions for reception of the PDSCH repetitions, wherein in a case that one or more symbols of a PDSCH transmission occasion overlap with one or more symbols indicated as uplink symbol by the RRC parameter, the PDSCH transmission occasion is not included as the multiple PDSCH transmission occasions for reception of the PDSCH repetitions; and receiving the PDSCH repetitions in the multiple PDSCH transmission occasions.

A method by a base station is described. The method of the base station includes transmitting, to a user equipment (UE), PDCCH with the first DCI format scheduling PDSCH repetitions, and a RRC parameter indicating slot format per slot; determining, to the UR, based on the first DCI format and the RRC parameter, multiple PDSCH transmission occasions for transmission of the PDSCH repetitions, wherein in a case that one or more symbols of a PDSCH transmission occasion overlap with one or more symbols indicated as uplink symbol by the RRC parameter, the PDSCH transmission occasion is not included as the multiple PDSCH transmission occasions for transmission of the PDSCH repetitions; and transmitting the PDSCH repetitions in the multiple PDSCH transmission occasions.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN). 3GPP NR (New Radio) is the name given to a project to improve the LTE mobile phone or device standard to cope with future requirements. In one aspect, LTE has been modified to provide support and specification (TS 38.331, 38.321, 38.300, 37.300, 38.211, 38.212, 38.213, 38.214, etc) for the New Radio Access (NR) and Next generation-Radio Access Network (NG-RAN).

At least some aspects of the systems and methods disclosed herein may be described in relation to the 3GPP LTE, LTE-Advanced (LTE-A), LTE-Advanced Pro, New Radio Access (NR), and other 3G/4G/5G standards (e.g., 3GPP Releases 8, 9, 10, 11, 12, 13, 14, and/or 15, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, a relay node, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a gNB, a Node B, an eNB, a home enhanced or evolved Node B (HeNB) or some other similar terminology. As the scope of the disclosure should not be limited to 3GPP standards, the terms "base station,", "gNB", "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced), IMT-2020 (5G) and all of it or a subset of it may be adopted by 3GPP as licensed bands (e.g., frequency bands) to be used for communication between a base station and a UE. It should also be noted that in NR, NG-RAN, E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by a base station to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The base stations may be connected by the NG interface to the 5G-core network (5G-CN). 5G-CN may be called as to NextGen core (NGC), or 5G core (5GC). The base stations may also be connected by the S1 interface to the evolved packet core (EPC). For instance, the base stations may be connected to a NextGen (NG) mobility management function by the NG-2 interface and to the NG core User Plane (UP) functions by the NG-3 interface. The NG interface supports a many-to-many relation between NG mobility management functions, NG core UP functions and the base stations. The NG-2 interface is the NG interface for the control plane and the NG-3 interface is the NG interface for the user plane. For instance, for EPC connection, the base stations may be connected to a mobility management entity (MME) by the S1-MME interface and to the serving gateway (S-GW) by the S1-U interface. The S1 interface supports a many-to-many relation between MMEs, serving gateways and the base stations. The S1-MME interface is the S1 interface for the control plane and the S1-U interface is the S1 interface for the user plane. The Uu interface is a radio interface between the UE and the base station for the radio protocol.

The radio protocol architecture may include the user plane and the control plane. The user plane protocol stack may include packet data convergence protocol (PDCP), radio link control (RLC), medium access control (MAC) and physical (PHY) layers. A DRB (Data Radio Bearer) is a radio bearer that carries user data (as opposed to control plane signaling). For example, a DRB may be mapped to the user plane protocol stack. The PDCP, RLC, MAC and PHY sublayers (terminated at the base station 460a on the network) may perform functions (e.g., header compression, ciphering, scheduling, ARQ and HARQ) for the user plane. PDCP entities are located in the PDCP sublayer. RLC entities may be located in the RLC sublayer. MAC entities may be located in the MAC sublayer. The PHY entities may be located in the PHY sublayer.

The control plane may include a control plane protocol stack. The PDCP sublayer (terminated in base station on the network side) may perform functions (e.g., ciphering and integrity protection) for the control plane. The RLC and MAC sublayers (terminated in base station on the network side) may perform the same functions as for the user plane. The Radio Resource Control (RRC) (terminated in base station on the network side) may perform the following functions. The RRC may perform broadcast functions, paging, RRC connection management, radio bearer (RB) control, mobility functions, UE measurement reporting and control. The Non-Access Stratum (NAS) control protocol (terminated in MME on the network side) may perform, among other things, evolved packet system (EPS) bearer management, authentication, evolved packet system connection management (ECM)-IDLE mobility handling, paging origination in ECM-IDLE and security control.

Signaling Radio Bearers (SRBs) are Radio Bearers (RB) that may be used only for the transmission of RRC and NAS messages. Three SRBs may be defined. SRB0 may be used for RRC messages using the common control channel (CCCH) logical channel. SRB1 may be used for RRC messages (which may include a piggybacked NAS message) as well as for NAS messages prior to the establishment of SRB2, all using the dedicated control channel (DCCH) logical channel. SRB2 may be used for RRC messages which include logged measurement information as well as for NAS messages, all using the DCCH logical channel. SRB2 has a lower-priority than SRB1 and may be configured by a network (e.g., base station) after security activation. A broadcast control channel (BCCH) logical channel may be used for broadcasting system information. Some of BCCH logical channel may convey system information which may be sent from the network to the UE via BCH (Broadcast Channel) transport channel. BCH may be sent on a physical broadcast channel (PBCH). Some of BCCH logical channel may convey system information which may be sent from the network to the UE via DL-SCH (Downlink Shared Channel) transport channel. Paging may be provided by using paging control channel (PCCH) logical channel.

For example, the DL-DCCH logical channel may be used (but not limited to) for a RRC reconfiguration message, a RRC reestablishment message, a RRC release, a UE Capability Enquiry message, a DL Information Transfer message or a Security Mode Command message. UL-DCCH logical channel may be used (but not limited to) for a measurement report message, a RRC Reconfiguration Complete message, a RRC Reestablishment Complete message, a RRC Setup Complete message, a Security Mode Complete message, a Security Mode Failure message, a UE Capability Information, message, a UL Handover Preparation Transfer message, a UL Information Transfer message, a Counter Check Response message, a UE Information Response message, a Proximity Indication message, a RN (Relay Node) Reconfiguration Complete message, an MBMS Counting Response message, an inter Frequency RSTD Measurement Indication message, a UE Assistance Information message, an In-device Coexistence Indication message, an MBMS Interest Indication message, an SCG Failure Information message. DL-CCCH logical channel may be used (but not limited to) for a RRC Connection Reestablishment message, a RRC Reestablishment Reject message, a RRC Reject message, or a RRC Setup message. UL-CCCH logical channel may be used (but not limited to) for a RRC Reestablishment Request message, or a RRC Setup Request message.

System information may be divided into the MasterInformationBlock (MIB) and a number of SystemInformationBlocks (SIBs).

The UE may receive one or more RRC messages from the base station to obtain RRC configurations or parameters. The RRC layer of the UE may configure RRC layer and/or lower layers (e.g., PHY layer, MAC layer, RLC layer, PDCP layer) of the UE according to the RRC configurations or parameters which may be configured by the RRC messages, broadcasted system information, and so on. The base station may transmit one or more RRC messages to the UE to cause the UE to configure RRC layer and/or lower layers of the UE according to the RRC configurations or parameters which may be configured by the RRC messages, broadcasted system information, and so on.

When carrier aggregation is configured, the UE may have one RRC connection with the network. One radio interface may provide carrier aggregation. During RRC establishment, re-establishment and handover, one serving cell may provide Non-Access Stratum (NAS) mobility information (e.g., a tracking area identity (TAI)). During RRC re-establishment and handover, one serving cell may provide a security input. This cell may be referred to as the primary cell (PCell). In the downlink, the component carrier corresponding to the PCell may be the downlink primary component carrier (DL PCC), while in the uplink it may be the uplink primary component carrier (UL PCC).

Depending on UE capabilities, one or more SCells may be configured to form together with the PCell a set of serving cells. In the downlink, the component carrier corresponding to an SCell may be a downlink secondary component carrier (DL SCC), while in the uplink it may be an uplink secondary component carrier (UL SCC).

The configured set of serving cells for the UE, therefore, may consist of one PCell and one or more SCells. For each SCell, the usage of uplink resources by the UE (in addition to the downlink resources) may be configurable. The number of DL SCCs configured may be larger than or equal to the number of UL SCCs and no SCell may be configured for usage of uplink resources only.

From a UE viewpoint, each uplink resource may belong to one serving cell. The number of serving cells that may be configured depends on the aggregation capability of the UE. The PCell may only be changed using a handover procedure (e.g., with a security key change and a random access procedure). A PCell may be used for transmission of the PUCCH. A primary secondary cell (PSCell) may also be used for transmission of the PUCCH. The PSCell may be referred to as a primary SCG cell or SpCell of a secondary cell group. The PCell or PSCell may not be de-activated. Re-establishment may be triggered when the PCell experiences radio link failure (RLF), not when the SCells experience RLF. Furthermore, NAS information may be taken from the PCell.

The reconfiguration, addition and removal of SCells may be performed by RRC. At handover or reconfiguration with sync, Radio Resource Control (RRC) layer may also add, remove or reconfigure SCells for usage with a target PCell. When adding a new SCell, dedicated RRC signaling may be used for sending all required system information of the SCell (e.g., while in connected mode, UEs need not acquire broadcasted system information directly from the SCells).

The systems and methods described herein may enhance the efficient use of radio resources in Carrier aggregation (CA) operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single base station is assumed to provide multiple serving cells for a UE. Even in scenarios where two or more cells may be aggregated (e.g., a macro cell aggregated with remote radio head (RRH) cells) the cells may be controlled (e.g., scheduled) by a single base station. However, in a small cell deployment scenario, each node (e.g., base station, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

In Dual Connectivity (DC) the UE may be required to be capable of UL-CA with simultaneous PUCCH/PUCCH and PUCCH/PUSCH transmissions across cell-groups (CGs). In a small cell deployment scenario, each node (e.g., eNB, RRH, etc.) may have its own independent scheduler. To maximize the efficiency of radio resources utilization of both nodes, a UE may connect to two or more nodes that have different schedulers. A UE may be configured multiple groups of serving cells, where each group may have carrier aggregation operation (e.g., if the group includes more than one serving cell). A UE in RRC_CONNECTED may be configured with Dual Connectivity or MR-DC, when configured with a Master and a Secondary Cell Group. A Cell Group (CG) may be a subset of the serving cells of a UE, configured with Dual Connectivity (DC) or MR-DC, i.e. a Master Cell Group (MCG) or a Secondary Cell Group (SCG). The Master Cell Group may be a group of serving cells of a UE comprising of the PCell and zero or more secondary cells. The Secondary Cell Group (SCG) may be a group of secondary cells of a UE, configured with DC or MR-DC, comprising of the PSCell and zero or more other secondary cells. A Primary Secondary Cell (PSCell) may be the SCG cell in which the UE is instructed to perform random access when performing the SCG change procedure. "PSCell" may be also called as a Primary SCG Cell. In Dual Connectivity or MR-DC, two MAC entities may be configured in the UE: one for the MCG and one for the SCG. Each MAC entity may be configured by RRC with a serving cell supporting PUCCH transmission and contention based Random Access. In a MAC layer, the term Special Cell (SpCell) may refer to such cell, whereas the term SCell may refer to other serving cells. The term SpCell either may refer to the PCell of the MCG or the PSCell of the SCG depending on if the MAC entity is associated to the MCG or the SCG, respectively. A Timing Advance Group (TAG) containing the SpCell of a MAC entity may be referred to as primary TAG (pTAG), whereas the term secondary TAG (sTAG) refers to other TAGs.

DC may be further enhanced to support Multi-RAT Dual Connectivity (MR-DC). MR-DC may be a generalization of the Intra-E-UTRA Dual Connectivity (DC) described in 36.300, where a multiple Rx/Tx UE may be configured to utilize resources provided by two different nodes connected via non-ideal backhaul, one providing E-UTRA access and the other one providing NR access. One node acts as a Mater Node (MN) and the other as a Secondary Node (SN). The MN and SN are connected via a network interface and at least the MN is connected to the core network. In DC, a PSCell may be a primary secondary cell. In EN-DC, a PSCell may be a primary SCG cell or SpCell of a secondary cell group.

E-UTRAN may support MR-DC via E-UTRA-NR Dual Connectivity (EN-DC), in which a UE is connected to one eNB that acts as a MN and one en-gNB that acts as a SN. The en-gNB is a node providing NR user plane and control plane protocol terminations towards the UE, and acting as Secondary Node in EN-DC. The eNB is connected to the EPC via the S1 interface and to the en-gNB via the X2 interface. The en-gNB might also be connected to the EPC via the S1-U interface and other en-gNBs via the X2-U interface.

A timer is running once it is started, until it is stopped or until it expires; otherwise it is not running. A timer can be started if it is not running or restarted if it is running. A Timer may be always started or restarted from its initial value.

For NR, a technology of aggregating NR carriers may be studied. Both lower layer aggregation like Carrier Aggregation (CA) for LTE and upper layer aggregation like DC are investigated. From layer 2/3 point of view, aggregation of carriers with different numerologies may be supported in NR.

The main services and functions of the RRC sublayer may include the following:

Broadcast of System Information related to Access Stratum (AS) and Non Access Stratum (NAS);
Paging initiated by CN or RAN;
Establishment, maintenance and release of an RRC connection between the UE and NR RAN including:
Addition, modification and release of carrier aggregation;
Addition, modification and release of Dual Connectivity in NR or between LTE and NR;
Security functions including key management;
Establishment, configuration, maintenance and release of signaling radio bearers and data radio bearers;
Mobility functions including:
Handover;
UE cell selection and reselection and control of cell selection and reselection;
Context transfer at handover.
QoS management functions;
UE measurement reporting and control of the reporting;
NAS message transfer to/from NAS from/to UE.
Each MAC entity of a UE may be configured by RRC with a Discontinuous Reception (DRX) functionality that controls the UE's PDCCH monitoring activity for the MAC entity's C-RNTI (Radio Network Temporary Identifier), CS-RNTI, INT-RNTI, SFI-RNTI, SP-CSI-RNTI, TPC-PUCCH-RNTI, TPC-PUSCH-RNTI, and TPC-SRS-RNTI. For scheduling at cell level, the following identities are used:
C (Cell)-RNTI: unique UE identification used as an identifier of the RRC Connection and for scheduling;

CS (Configured Scheduling)-RNTI: unique UE identification used for Semi-Persistent Scheduling in the downlink;

INT-RNTI: identification of pre-emption in the downlink;

P-RNTI: identification of Paging and System Information change notification in the downlink;

SI-RNTI: identification of Broadcast and System Information in the downlink;

SP-CSI-RNTI: unique UE identification used for semi-persistent CSI reporting on PUSCH;

CI-RNTI: Cancellation Indication RNTI for Uplink.

For power and slot format control, the following identities are used:

SFI-RNTI: identification of slot format;

TPC-PUCCH-RNTI: unique UE identification to control the power of PUCCH;

TPC-PUSCH-RNTI: unique UE identification to control the power of PUSCH;

TPC-SRS-RNTI: unique UE identification to control the power of SRS;

During the random access procedure, the following identities are also used:

RA-RNTI: identification of the Random Access Response in the downlink;

Temporary C-RNTI: UE identification temporarily used for scheduling during the random access procedure;

Random value for contention resolution: UE identification temporarily used for contention resolution purposes during the random access procedure.

For NR connected to 5GC, the following UE identities are used at NG-RAN level:

I-RNTI: used to identify the UE context in RRC_INACTIVE.

The size of various fields in the time domain is expressed in time units $T_c=1/(\Delta f_{max}\cdot N_f)$ where $\Delta f_{max}=480\cdot10^3$ Hz and $N_f=4096$. The constant $\kappa=T_s/T_c=64$ where $T_s=1/(\Delta f_{ref}\cdot N_{f,ref})$, $\Delta f_{ref}=15\cdot10^3$ Hz and $N_{f,ref}=2048$.

Multiple Orthogonal Frequency Division Multiplexing (OFDM) numerologies are supported as given by Table 4.2-1 of [TS 38.211] where μ and the cyclic prefix for a bandwidth part are obtained from the higher-layer parameter subcarrierSpacing and cyclicPrefix, respectively.

The size of various fields in the time domain may be expressed as a number of time units $T_s=1/(15000\times2048)$ seconds. Downlink and uplink transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 consisting of subframes 0-4 and half-frame 1 consisting of subframes 5-9.

For subcarrier spacing (SCS) configuration μ, slots are numbered $n_s^{\mu}\in\{0, \ldots, N_{slot}^{subframe,\mu}-1\}$ in increasing order within a subframe and $n_{s,f}^{\mu}\in\{0, \ldots, N_{slot}^{frame,\mu}-1\}$ in increasing order within a frame. $N_{slot}^{subframe,\mu}$ is the number of slots per subframe for subcarrier spacing configuration μ. There are $N_{symb}^{slot}$ consecutive OFDM symbols in a slot where $N_{symb}^{slot}$ depends on the cyclic prefix as given by Tables 4.3.2-1 and 4.3.2-2 of [TS 38.211]. The start of slot $n_s^{\mu}$ in a subframe is aligned in time with the start of OFDM symbol $\mu_s^{\mu}N_{symb}^{slot}$ in the same subframe. Subcarrier spacing refers to a spacing (or frequency bandwidth) between two consecutive subcarrier in the frequency domain. For example, the subcarrier spacing can be set to 15 kHz, 30 kHz, 60 kHz, 120 kHz, or 240 kHz. A resource block is defined as a number of consecutive subcarriers (e.g. 12) in the frequency domain. For a carrier with different frequency, the applicable subcarrier may be different. For example, for a carrier in a frequency range 1, a subcarrier spacing only among a set of {15 kHz, 30 kHz, 60 kHz} is applicable. For a carrier in a frequency range 2, a subcarrier spacing only among a set of {60 kHz, 120 kHz, 240 kHz} is applicable. The base station may not configure an inapplicable subcarrier spacing for a carrier.

OFDM symbols in a slot can be classified as 'downlink', 'flexible', or 'uplink'. Signaling of slot formats is described in subclause 11.1 of [TS 38.213].

In a slot in a downlink frame, the UE may assume that downlink transmissions only occur in 'downlink' or 'flexible' symbols. In a slot in an uplink frame, the UE may only transmit in 'uplink' or 'flexible' symbols.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more base stations 160 (e.g., eNB, gNB) and one or more user equipments (UEs) 102 in which systems and methods for determining the repetition transmission of a PDCCH and/or a PDSCH may be implemented. The one or more UEs 102 may communicate with one or more base stations 160 using one or more antennas 122a-n. For example, a UE 102 transmits electromagnetic signals to the base station 160 and receives electromagnetic signals from the base station 160 using the one or more antennas 122a-n. The base station 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the base stations 160 described herein may be implemented in a single device. For example, multiple base stations 160 may be combined into a single device in some implementations. In the context of FIG. 1, for instance, a single device may include one or more UEs 102 in accordance with the systems and methods described herein. Additionally or alternatively, one or more base stations 160 in accordance with the systems and methods described herein may be implemented as a single device or multiple devices.

The UE 102 and the base station 160 may use one or more channels 119, 121 to communicate with each other. For example, a UE 102 may transmit information or data to the base station 160 using one or more uplink (UL) channels 121 and signals. Examples of uplink channels 121 include a physical uplink control channel (PUCCH) and a physical uplink shared channel (PUSCH), etc. Examples of uplink signals include a demodulation reference signal (DMRS) and a sounding reference signal (SRS), etc. The one or more base stations 160 may also transmit information or data to the one or more UEs 102 using one or more downlink (DL) channels 119 and signals, for instance. Examples of downlink channels 119 include a PDCCH, a PDSCH, etc. A PDCCH can be used to schedule DL transmissions on PDSCH and UL transmissions on PUSCH, where the Downlink Control Information (DCI) on PDCCH includes downlink assignment and uplink grants. The PDCCH is used for transmitting Downlink Control Information (DCI) in a case of downlink radio communication (radio communication from the base station to the UE). Here, one or more DCIs (may be referred to as DCI formats) are defined for transmission of downlink control information. Information bits are mapped to one or more fields defined in a DCI format. Examples of downlink signals include a primary synchronization signal (PSS), a secondary synchronization signal (SSS), a cell-specific reference signal (CRS), a non-zero power channel state information reference signal (NZP CSI-RS), and a zero power channel state information reference signal (ZP CSI-RS), etc. Other kinds of channels or signals may be used.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the base station 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the base station 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more base stations 160. The UE operations module 124 may include a UE RRC information configuration module 126. The LIE operations module 124 may include a UE repetition control module 128. In some implementations, the UE operations module 124 may include physical (PHY) entities, Medium Access Control (MAC) entities, Radio Link Control (RLC) entities, packet data convergence protocol (PDCP) entities, and an Radio Resource Control (RRC) entity. For example, the UE RRC information configuration module 126 may process RRC parameters received from the base station. The UE repetition control module (processing module) 128 may determine when and where to monitor or search the configured PDCCH candidates for each search space set in a CORESET based on the processing output from the UE RRC information configuration module 126. The UE repetition control module 128 may determine whether PDCCH candidate repetition is applied or not based on the processing output from the UE RRC information configuration module 126. The UE repetition control module 128 may determine a set of one or more PDCCH monitoring occasions for a search space set in a CORESET wherein each PDCCH candidate is repeated in the one or more PDCCH monitoring occasions in the CORESET. The UE repetition control module 128 may determine the respective location of the one or more PDCCH monitoring occasions in the set and the total number of the PDCCH monitoring occasions in the set. The location of a PDCCH monitoring occasion herein at least includes an index of a slot that the PDCCH monitoring occasion exists and/or an index for the first symbol of the PDCCH monitoring occasion in the slot.

The UE repetition control module 128 may determine, based on the processing output (e.g. a first RRC parameter indicating a slot format, a second RRC parameter indicating a configuration of invalid symbols, a slot format configuration provided by a DCI format 2_0) from the UE RRC information configuration module 126, a PDSCH transmission occasion is an applicable PDSCH transmission occasion or an inapplicable PDSCH transmission occasion. The UE repetition control module 128 may determine, based on the processing output, whether to postpone or omit a reception of a repetition of a PDSCH in an inapplicable PDSCH transmission occasion.

The UE operations module 124 may provide the benefit of performing PDCCH candidate search and monitoring efficiently.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC reconfiguration message), MAC control element, and/or the DCI (Downlink Control Information). The UE operations module 124 may provide information 148, including the PDCCH monitoring occasions and DCI format size, to the one or more receivers 120. The UE operation module 124 may inform the receiver(s) 120 when or where to receive/monitor the PDCCH candidate for DCI formats with which DCI size.

The UE operations module 124 may provide information 138 to the demodulator 114. For example, the UE operations module 124 may inform the demodulator 114 of a modulation pattern anticipated for transmissions from the base station 160.

The UE operations module 124 may provide information 136 to the decoder 108. For example, the UE operations module 124 may inform the decoder 108 of an anticipated encoding for transmissions from the base station 160. For example, the UE operations module 124 may inform the decoder 108 of an anticipated PDCCH candidate encoding with which DCI size for transmissions from the base station 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the base station 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the base station 160. The one or more transmitters 158 may upconvert and transmit the modulated signal(s) 156 to one or more base stations 160.

The base station 160 may include one or more transceivers 176, one or more demodulators 172, one or more decoders 166, one or more encoders 109, one or more modulators 113, one or more data buffers 162 and one or more base station operations modules 182. For example, one or more reception and/or transmission paths may be implemented in a base station 160. For convenience, only a single transceiver 176, decoder 166, demodulator 172, encoder 109 and modulator 113 are illustrated in the base station 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180_a-n_. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180_a-n_. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The base station 160 may use the decoder 166 to decode signals. The decoder 166 may produce one or more decoded signals 164, 168. For example, a first base station-decoded signal 164 may comprise received payload data, which may be stored in a data buffer 162. A second base station-decoded signal 168 may comprise overhead data and/or control data. For example, the second base station-decoded signal 168 may provide data (e.g., PUSCH transmission data) that may be used by the base station operations module 182 to perform one or more operations.

In general, the base station operations module 182 may enable the base station 160 to communicate with the one or more UEs 102. The base station operations module 182 may include a base station RRC information configuration module 194. The base station operations module 182 may include a base station repetition control module 196 (or a base station repetition processing module 196). The base station operations module 182 may include PHY entities, MAC entities, RLC entities, PDCP entities, and an RRC entity.

The base station repetition control module 196 may determine, for respective UE, when and where to monitor or search a configured PDCCH candidate for a search space set in a CORSET. The base station repetition control module 196 may determine, for UE(s), whether the PDCCH candidate repetition is applied or not. The base station repetition control module 196 may determine, for UE(s), a set of one or more PDCCH monitoring occasions for a search space set in a CORESET wherein each PDCCH candidate is repeated in the one or more PDCCH monitoring occasions in the CORESET. The base station repetition control module 196 may determine, for a UE, the respective location of the one or more PDCCH monitoring occasions in the set and the total number of the PDCCH monitoring occasions in the set. The base station repetition control module 196 may determine, for a UE, a slot where the set of the one or more PDCCH monitoring occasions for PDCCH repetitions starts.

The base station repetition control module 196 may input the determined information to the base station RRC information configuration module 194. The base station RRC information configuration module 194 may generate RRC parameters for search space configurations and CORESET configuration based on the output from the base station repetition control module 196.

The base station RRC information configuration module 194 may generate, to a UE, a first RRC parameter indicating a slot format and a second RRC parameter indicating a configuration of invalid symbols. The base station RRC information configuration module 194 may determine a slot format configuration and generate a DCI to indicate the slot format configuration.

The base station repetition control module 196 may determine, for a UE, based on the one, more, or all of the generated first RRC parameter, the second RRC parameter, and the DCI, a PDSCH transmission occasion is an applicable PDSCH transmission occasion or an inapplicable PDSCH transmission occasion. The base station repetition control module 196 may determine whether to postpone or omit a transmission of a repetition of a PDSCH in an inapplicable PDSCH transmission occasion.

The base station operations module 182 may provide the benefit of performing PDCCH candidate search and monitoring efficiently.

The base station operations module 182 may provide information 190 to the one or more receivers 178. For example, the base station operations module 182 may inform the receiver(s) 178 when or when not to receive transmissions based on the RRC message (e.g., broadcasted system information, RRC reconfiguration message), MAC control element, and/or the DCI (Downlink Control Information).

The base station operations module 182 may provide information 188 to the demodulator 172. For example, the base station operations module 182 may inform the demodulator 172 of a modulation pattern anticipated for transmissions from the UE(s) 102.

The base station operations module 182 may provide information 186 to the decoder 166. For example, the base station operations module 182 may inform the decoder 166 of an anticipated encoding for transmissions from the UE(s) 102.

The base station operations module 182 may provide information 101 to the encoder 109. The information 101 may include data to be encoded and/or instructions for encoding. For example, the base station operations module 182 may instruct the encoder 109 to encode transmission data 105 and/or other information 101.

In general, the base station operations module 182 may enable the base station 160 to communicate with one or more network nodes (e.g., a NG mobility management function, a NG core UP functions, a mobility management entity (MME), serving gateway (S-GW), gNBs). The base station operations module 182 may also generate a RRC reconfiguration message to be signaled to the UE 102.

The encoder 109 may encode transmission data 105 and/or other information 101 provided by the base station operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The base station operations module 182 may provide information 103 to the modulator 113. This information 103 may include instructions for the modulator 113. For example, the base station operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The base station operations module 182 may provide information 192 to the one or more transmitters 117. This information 192 may include instructions for the one or more transmitters 117. For example, the base station operations module 182 may instruct the one or more transmitters 117 when to (or when not to) transmit a signal to the UE(s) 102. The base station operations module 182 may provide information 192, including the PDCCH monitoring occasions and DCI format size, to the one or more transmitters 117. The base station operation module 182 may inform the transmitter(s) 117 when or where to transmit the PDCCH candidate for DCI formats with which DCI size. The one or more transmitters 117 may upconvert and transmit the modulated signal(s) 115 to one or more UEs 102.

It should be noted that one or more of the elements or parts thereof included in the base station(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

A base station may generate a RRC message including the one or more RRC parameters, and transmit the RRC message to a UE. A UE may receive, from a base station, a RRC message including one or more RRC parameters. The term 'RRC parameter(s)' in the present disclosure may be alter-natively referred to as 'RRC information element(s)'. A RRC parameter may further include one or more RRC parameter(s). In the present disclosure, a RRC message may include system information. a RRC message may include one or more RRC parameters. A RRC message may be sent on a broadcast control channel (BCCH) logical channel, a common control channel (CCCH) logical channel or a dedicated control channel (DCCH) logical channel.

In the present disclosure, a description 'a base station may configure a UE to' may also imply/refer to 'a base station may transmit, to a UE, an RRC message including one or more RRC parameters'. Additionally or alternatively, 'RRC parameter configure a UE to' may also refer to 'a base station may transmit, to a UE, an RRC message including one or more RRC parameters'. Additionally or alternatively, 'a UE is configured to' may also refer to 'a UE may receive, from a base station, an RRC message including one or more RRC parameters'.

A base station may transmit a RRC message including one or more RRC parameters related to BWP configuration to a UE. A UE may receive the RRC message including one or more RRC parameters related to BWP configuration from a base station. For each cell, the base station may configure at least an initial DL BWP and one initial uplink bandwidth parts (initial UL BWP) to the UE. Furthermore, the base station may configure additional UL and DL BWPs to the UE for a cell.

A RRC parameters initialDownlinkBWP may indicate the initial downlink BWP (initial DL BWP) configuration for a serving cell (e.g., a SpCell and Scell). The base station may configure the RRC parameter locationAndBandwidth included in the initialDownlinkBWP so that the initial DL BWP contains the entire CORESET 0 of this serving cell in the frequency domain. The locationAndBandwidth may be used to indicate the frequency domain location and band-width of a BWP. A RRC parameters initialUplinkBWP may indicate the initial uplink BWP (initial UL BWP) configuration for a serving cell (e.g., a SpCell and Scell). The base station may transmit initialDownlinkBWP and/or initialU-plinkBWP which may be included in SIB1, RRC parameter ServingCellConfigCommon, or RRC parameter Serving-CellConfig to the UE.

SIB1, which is a cell-specific system information block (SystemInformationBlock, SIB), may contain information relevant when evaluating if a UE is allowed to access a cell and define the scheduling of other system information. SIB1 may also contain radio resource configuration information that is common for all UEs and barring information applied to the unified access control. The RRC parameter Serving-CellConfigCommon is used to configure cell specific param-eters of a UE's serving cell. The RRC parameter Serving-CellConfig is used to configure (add or modify) the UE with a serving cell, which may be the SpCell or an SCell of an MCS or SCG. The RRC parameter ServingCellConfig herein are mostly UE specific but partly also cell specific.

The base station may configure the UE with a RRC parameter BWP-Downlink and a RRC parameter BWP-Uplink. The RRC parameter BWP-Downlink can be used to configure an additional DL BWP. The RRC parameter BWP-Uplink can be used to configure an additional UL BWP. The base station may transmit the BWP-Downlink and the BWP-Uplink which may be included in RRC parameter ServingCellConfig to the UE.

If a UE is not configured (provided) initialDownlinkBWP from a base station, an initial DL BWP is defined by a location and number of contiguous physical resource blocks (PRBs), starting from a PRB with the lowest index and ending at a PRB with the highest index among PRBs of a CORESET for Type0-PDCCH CSS set (i.e., CORESET 0), and a subcarrier spacing (SCS) and a cyclic prefix for PDCCH reception in the CORESET for Type0-PDCCH CSS set. If a UE is configured (provided) initialDownlinkBWP from a base station, the initial DL BWP is provided by initialDownlinkBWP. If a UE is configured (provided) initialUplinkBWP from a base station, the initial UL BWP is provided by initialUplinkBWP.

The UE may be configured by the based station, at least one initial BWP and up to 4 additional BWP(s). One of the initial BWP and the configured additional BWP(s) may be activated as an active BWP. The UE may monitor DCI format, and/or receive PDSCH in the active DL BWP. The UE may not monitor DCI format, and/or receive PDSCH in a DL BWP other than the active DL BWP. The UE may transmit PUSCH and/or PUCCH in the active UL BWP. The UE may not transmit PUSCH and/or PUCCH in a BWP other than the active UL BWP.

As above-mentioned, a UE may monitor DCI format in the active DL BWP. To be more specific, a UE may monitor a set of PDCCH candidates in one or more CORESETs on the active DL BWP on each activated serving cell configured with PDCCH monitoring according to corresponding search space set where monitoring implies decoding each PDCCH candidate according to the monitored DCI formats.

A set of PDCCH candidates for a UE to monitor is defined in terms of PDCCH search space sets. A search space set can be a CSS set or a USS set. A UE may monitor a set of PDCCH candidates in one or more of the following search space sets a Type0-PDCCH CSS set configured by pdcch-ConfigSIBl in MIB or by searchSpaceSIB1 in PDCCH-ConfigCommon or by searchSpaceZero in PDCCH-ConfigCommon for a DCI format with CRC scrambled by a SI-RNTI on the primary cell of the MCG a Type0A-PDCCH CSS set configured by searchSpaceOtherSysteminformation in PDCCH-ConfigCommon for a DCI format with CRC scrambled by a SI-RNTI on the primary cell of the MCG a Type1-PDCCH CSS set configured by ra-SearchSpace in PDCCH-ConfigCommon for a DCI format with CRC scrambled by a RA-RNTI or a TC-RNTI on the primary cell a Type2-PDCCH CSS set configured by paging-SearchSpace in PDCCH-ConfigCommon for a DCI format with CRC scrambled by a P-RNTI on the primary cell of the MCG a Type3-PDCCH CSS set configured by SearchSpace in PDCCH-Config with searchSpaceType=common for DCI formats with CRC scrambled by TNT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

For a DL BWP, if a UE is configured (provided) one above-described search space set, the UE may determine PDCCH monitoring occasions for a set of PDCCH candidates of the configured search space set. PDCCH monitoring occasions for monitoring PDCCH candidates of a search space set s is determined according to the search space set s configuration and a CORESET configuration associated with the search space set s. In other words, a UE may monitor a set of PDCCH candidates of the search space set in the determined (configured) PDCCH monitoring occasions in one or more configured control resource sets (CORESETs) according to the corresponding search space set configurations and CORESET configuration. A base station may transmit, to a UE, information to specify one or more CORESET configuration and/or search space configuration. The information may be included in MIB and/or SIBs broadcasted by the base station. The information may be included in RRC configurations or RRC parameters. A base station may broadcast system information such as MIB, SIBs to indicate CORESET configuration or search space configuration to a UE. Or the base station may transmit a RRC message including one or more RRC parameters related to CORESET configuration and/or search space configuration to a UE.

An illustration of search space set configuration is described below.

A base station may transmit a RRC message including one or more RRC parameters related to search space configuration. A base station may determine one or more RRC parameter(s) related to search space configuration for a UE. A UE may receive, from a base station, a RRC message including one or more RRC parameters related to search space configuration. RRC parameter(s) related to search space configuration (e.g. SearchSpace, searchSpaceZero) defines how and where to search for PDCCH candidates. 'search/monitor for PDCCH candidate for a DCI format' may also refer to 'monitor/search for a DCI format' for short.

For example, a RRC parameter searchSpaceZero is used to configure a common search space 0 of an initial DL BWP. The searchSpaceZero corresponds to 4 bits. The base station may transmit the searchSpaceZero via PBCH(MIB) or ServingCell.

Additionally, a RRC parameter SearchSpace is used to define how/where to search for PDCCH candidates. The RRC parameters search space may include a plurality of RRC parameters as like, searchSpaceId, controlResourceSetId, monitoringSlotPeriodicityAndOffset, duration, monitoringSymbolsWithinSlot, nrofCandidates, searchSpaceType. Some of the above-mentioned RRC parameters may be present or absent in the RRC parameters SearchSpace. Namely, the RRC parameter SearchSpace may include all the above-mentioned RRC parameters. Namely, the RRC parameter SearchSpace may include one or more of the above-mentioned RRC parameters. If some of the parameters are absent in the RRC parameter SearchSpace, the UE 102 may apply a default value for each of those parameters.

Herein, the RRC parameter searchSpaceId is an identity or an index of a search space. The RRC parameter searchSpaceId is used to identify a search space. Or rather, the RRC parameter serchSpaceId provide a search space set index s, $0<=s<40$. Then a search space s hereinafter may refer to a search space identified by index s indicated by RRC parameter searchSpaceId. The RRC parameter controlResourceSetId concerns an identity of a CORESET, used to identify a CORESET. The RRC parameter controlResourceSetId indicates an association between the search space s and the CORESET identified by controlResourceSetId. The RRC parameter controlResourceSetId indicates a CORESET applicable for the search space. CORESET p hereinafter may refer to a CORESET identified by index p indicated by RRC parameter controlResourceSetId. Each search space is associated with one CORESET. The RRC parameter monitoringSlotPeriodicityAndOffset is used to indicate slots for PDCCH monitoring configured as periodicity and offset. Specifically, the RRC parameter monitoringSlotPeriodicityAndOffset indicates a PDCCH monitoring periodicity of $k_s$ slots and a PDCCH monitoring offset of $o_s$ slots. A UE can determine which slot is configured for PDCCH monitoring according to the RRC parameter monitoringSlotPeriodicityAndOffset. The RRC parameter monitoringSymbolsWithinSlot is used to indicate a first symbol (s) for PDCCH monitoring in the slots configured for PDCCH monitoring. That is, the parameter monitoringSymbolsWithinSlot provides a PDCCH monitoring pattern within a slot, indicating first symbol(s) of the CORESET within a slot (configured slot) for PDCCH monitoring. The RRC parameter duration indicates a number of consecutive slots $T_s$ that the search space lasts (or exists) in every occasion (PDCCH occasion, PDCCH monitoring occasion).

The RRC parameter may include aggregationLevel1, aggregationLevel2, aggregationLevel4, aggregationLevel8, aggregationLevel16. The RRC parameter nrofCandidates may provide a number of PDCCH candidates per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, for CCE aggregation level 8, and CCE aggregation level 16, respectively. In other words, the value L can be set to either one in the set {1, 2, 4, 8, 16}. The number of PDCCH candidates per CCE aggregation level L can be configured as 0, 1, 2, 3, 4, 5, 6, or 8. For example, in a case the number of PDCCH candidates per CCE aggregation level L is configured as 0, the UE may not search for PDCCH candidates for CCE aggregation L. That is, in this case, the UE may not monitor PDCCH candidates for CCE aggregation L of a search space set s. For example, the number of PDCCH candidates per CCE aggregation level L is configured as 4, the UE may monitor 4 PDCCH candidates for CCE aggregation level L of a search space set s.

The RRC parameter searchSpaceType is used to indicate that the search space set s is either a CSS set or a USS set. The RRC parameter searchSpaceType may include either a common or a ue-Specific. The RRC parameter common configure the search space set s as a CSS set and DCI format to monitor. The RRC parameter ue-Specific configures the search space set s as a USS set. The RRC parameter ue-Specific may include dci-Formats. The RRC parameter dci-Formats indicates to monitor PDCCH candidates either for DCI format 0_0 and DCI format 1_0, or for DCI format 0_1 and DCI format 1_1 in search space set s. That is, the RRC parameter searchSpaceType indicates whether the search space set s is a CSS set or a USS set as well as DCI formats to monitor for.

A USS at CCE aggregation level L is defined by a set of PDCCH candidates for CCE aggregation L. A USS set may be constructed by a plurality of USS corresponding to respective CCE aggregation level L. A USS set may include one or more USS(s) corresponding to respective CCE aggregation level L. A CSS at CCE aggregation level L is defined by a set of PDCCH candidates for CCE aggregation L. A CSS set may be constructed by a plurality of USS corresponding to respective CCE aggregation level L. A CSS set may include one or more CSS(s) corresponding to respective CCE aggregation level L.

As above-mentioned, the PDCCH is used for transmitting or carrying Downlink Control Information (DCI). Thus, 'PDCCH' and 'DCI (or DCI format, or PDCCH candidates)' are virtually interchangeable. In other words, 'a UE monitors PDCCH' implies 'a UE monitors PDCCH for a DCI format'. That is, 'a UE monitors PDCCH' implies 'a UE monitors PDCCH for detection of a configured DCI format'.

'a UE monitors PDCCH' can also refer to 'a UE monitors PDCCH candidates for a DCI format'. Additionally, 'a UE monitors PDCCH for a search space set s' also refers to 'a UE may monitor a set of PDCCH candidates of the search space set s'. To be specific, 'a UE monitor PDCCH for a search space set s' also refers to 'a UE may attempt to decode each PDCCH candidate of the search space set s according to the monitored DCI formats'.

In the present disclosure, the term "PDCCH search space sets" may also refer to "PDCCH search space". A UE monitors PDCCH candidates in one or more search space sets. A search space sets can be a common search space (CSS) set or a UE-specific search space (USS) set. In some implementations, a CSS set may be shared/configured among multiple UEs. The multiple UEs may search PDCCH candidates in the CSS set. In some implementations, a USS set is configured for a specific UE. The UE may search one or more PDCCH candidates in the USS set. In some implementations, a USS set may be at least derived from a value of C-RNTI addressed to a UE.

An illustration of CORESET configuration is described below.

A base station may configure a UE one or more CORESETs for each DL BWP in a serving cell. For example, a RRC parameter ControlResourceSetZero is used to configure CORESET 0 of an initial DL BWP. The RRC parameter ControlResourceSetZero corresponds to 4 bits. The base station may transmit ControlResourceSetZero, which may be included in MIB or RRC parameter ServingCellConfigCommon, to the UE. MIB may include the system information transmitted on BCH(PBCH). A RRC parameter related to initial DL BWP configuration may also include the RRC parameter ControlResourceSetZero. RRC parameter ServingCellConfigCommon is used to configure cell specific parameters of a UE's serving cell and contains parameters which a UE would typically acquire from SSB, MIB or SIBs when accessing the cell form IDLE.

Additionally, a RRC parameter ControlResourceSet is used to configure a time and frequency CORESET other than CORESET 0. The RRC parameter ControlResourceSet may include a plurality of RRC parameters such as, ControlResourceSetId, frequencyDomainResource, duration, cce-REG-MappingType, precoderGranularity, tci-PresentInDCI, pdcch-DMRS-ScramblingID and so on.

Here, the RRC parameter ControlResourceSetId is an CORESET index p, used to identify a CORESET within a serving cell, where $0 < p < 12$. The RRC parameter duration indicates a number of consecutive symbols of the CORESET $N_{symb}^{CORESET}$ which can be configured as 1, 2 or 3 symbols. A CORESET consists of a set of $N_{RB}^{CORESET}$ resource blocks (RBs) in the frequency domain and $N_{symb}^{CORESET}$ symbols in the time domain. The RRC parameter frequencyDomainResource indicates the set of $N_{RB}^{CORESET}$ RBs for the CORESET. Each bit in the frequencyDomainResource corresponds a group of 6 RBs, with grouping starting from the first RB group in the BWP. The first (left-most/most significant) bit corresponds to the first RB group in the BWP, and so on. A bit that is set to 1 indicates that this RB group belongs to the frequency domain resource of this CORESET.

According to the CORESET configuration, a CORESET (a CORESET 0 or a CORESET p) consists of a set of PRBs with a time duration of 1 to 3 OFDM symbols. The resource units Resource Element Groups (REGs) and Control Channel Elements (CCEs) are defined within a CORESET. A CCE consisting of 6 REGs where a REG equals one resource block during one OFDM symbol. Control channels are formed by aggregation of CCE. That is, a PDCCH consists of one or more CCEs. Different code rates for the control channels are realized by aggregating different number of CCE. Interleaved and non-interleaved CCE-to-REG mapping are supported in a CORESET. Each resource element group carrying PDCCH carries its own DMRS.

Figure 2:
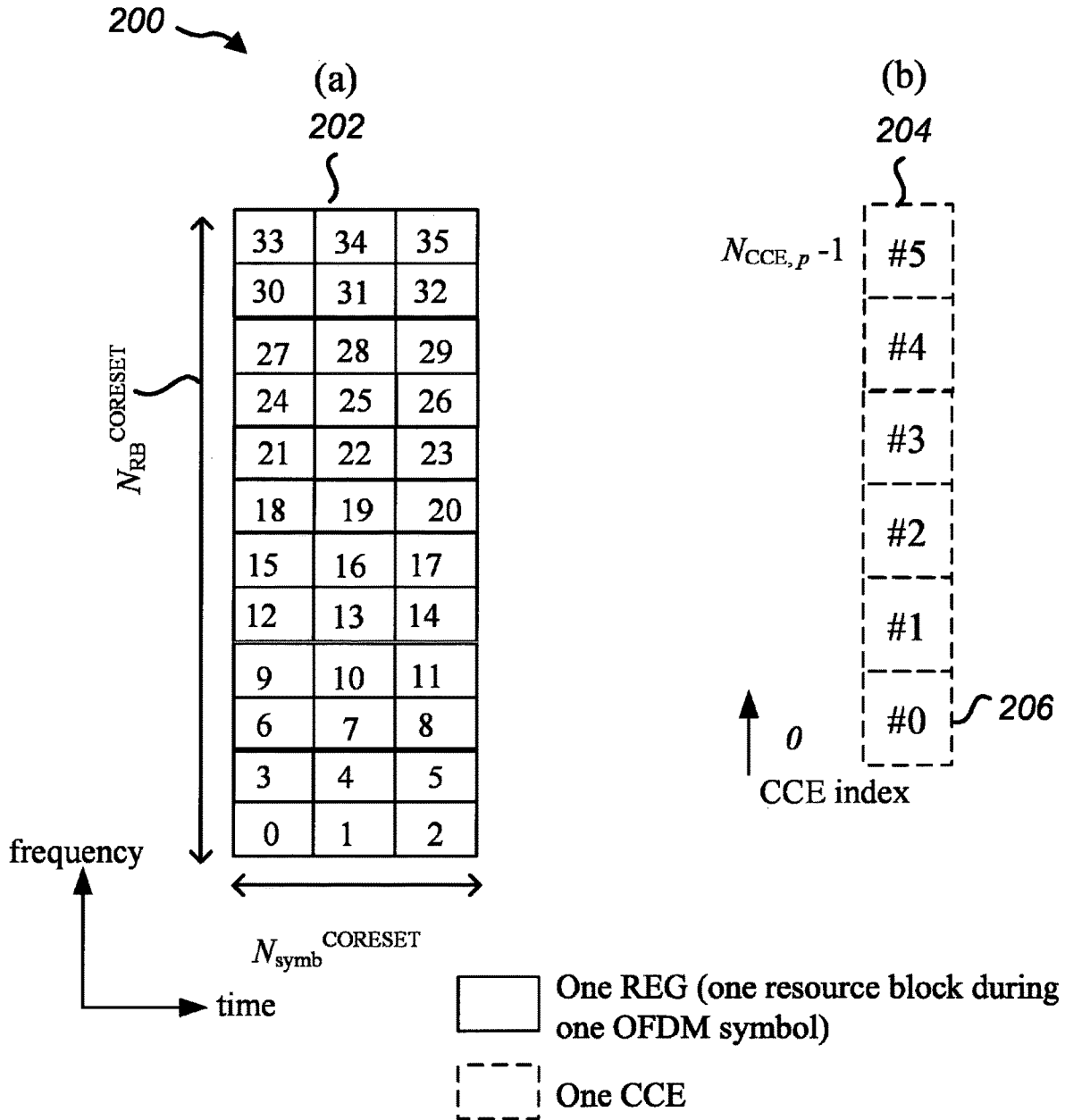
FIG. 2 is a diagram illustrating one example 200 of Resource Element Group (REG) and Control Channel Element (CCE), resource numbering for a Control Resource Set (CORESET)

FIG. 2 is a diagram illustrating one example 200 of REG and CCE resource numbering for a CORESET.

The UE 102 may monitor a set of PDCCH candidates for a search space set in a CORESET p which consist of a set of $N_{RB}^{CORESET}$ PRBs and one sets of $N_{symb}^{CORESET}$ consecutive OFDM symbols. The resource blocks $N_{RB}^{CORESET}$ PRBs configured for the CORESET can be contiguous or can be not contiguous in the frequency domain. For the CORESET, the REGs within the CORESET are numbered in increasing order in time-first manner, starting with 0 for the first OFDM symbol and the lowest-numbered resource block in the CORESET. In FIG. 2 (*a*), REGs within the CORESET are numbered in increasing order in time-first manner, starting with 0 for the first OFDM symbol and the lowest-numbered resource block in the 202. The REGs within the CORESET 202 are numbered by 0 to 35 by the time-first manner. The REGs for different PDCCH monitoring occasion in a same CORESET are numbered by the same way. That is, one or more PDCCH monitoring occasions in a same CORESET may have same REG mapping.

On the other hand, in the present disclosure, the OFDM symbols configured for CORESET in time domain can be contiguous or can be not contiguous. For example, the CORESET in time domain may consist of more than one set of consecutive OFDM symbol(s). The number of consecutive OFDM symbol(s) for each set can be same and may be indicated by one same RRC parameter. Additionally, the number of consecutive OFDM symbol(s) for each set can be different and can be indicated by corresponding RRC parameters, respectively. These RRC parameters relating to the number of consecutive OFDM symbol(s) for each set can be included in the CORESET configuration and/or search space configuration. The CORESET for PDCCH monitoring can cross one or multiple slots.

In FIG. 2 (*b*), $N_{CCE,p}$ is the number of CCEs, numbered from 0 to ($N_{CCE,p}-1$), in the CORESET. The CORESET herein comprises of 6 CCEs. According to the CCE-to-REG mapping, UE 102 may determine a CCE comprising of which corresponding REGs. For non-interleaved CCE-to-REG mapping, all CCEs for a DCI with AL L are mapped in consecutive REG bundles of the CORESET. For example, for non-interleaved CCE-to-REG mapping, a CCE with index 0 (CCE #0) 206 comprises of 6 consecutive REGs with 0, 1, 2, 3, 4, 5. For interleaved CCE-to-REG mapping, REG bundles constituting the CCEs for a PDCCH are distributed in the frequency domain in units of REG bundles. A REG bundle i is defined as REGs {i*B, i*B+1, . . . , i*B+B−1} where B is the REG bundle size indicated by the base station.

The UE 102 can determine the CCE indexes for aggregation level L corresponding to PDCCH candidates of a USS for a USS set based on the value of C-RNTI addressed to the UE. The UE can determine the CCE indexes for aggregation level L corresponding to PDCCH candidates of a CSS for a CSS set without the value of C-RNTI addressed to the UE.

To be more specific, for a search space set s associated with CORESET p, the CCE indexes for aggregation level L corresponding to PDCCH candidate $m_{s,n\_CI}$ of the search space set in slot n for an active DL BWP of a serving cell corresponding to carrier indicator field value, CIF value, n_CI are given by Formula (4) $L*((Y_{p,n}+$ $floor((m_{s,n\_CI}*N_{CCE,\ p})/(L*M_{s,max}^{(L)})+n\_CI)mod$ (floor $(N_{CCE,\ p}/L)))+i$. The parameters in the Formula (4) are illustrated as below: for any CSS, $Y_{p,n}$ is equal to 0, while for a USS, $Y_{p,n}=(A_p*Y_{p,n-1})$ mod D where $Y_{p,-1}=n_{RNTI}\neq 0$, $A_p=39827$ for p mod 3=0, $A_p=39829$ for p mod 3=1, $A_p=39839$ for p mod 3=2, and D=65537; slot n can be denoted by $n^u_{s,f}$ representing the slot number within a radio frame with respect to the SCS configuration u; i=0, . . . , L−1; $N_{CCE,p}$ is the number of CCEs, numbered from 0 to ($N_{CCE,p}-1$), in CORESET p; $n_{RNTI}$ is an value of C-RNTI provided by the base station for the UE; n_CI is the carrier indicator field value if the UE 102 is configured with a carrier indicator field for the serving cell on which PDCCH is monitored; otherwise, including for any CSS, the n_CI is equal to 0; $m_{s,n\_CI}=0, . . . , M_{s,n\_CI}^{L)}-1$, where $M_{s,n\_CI}^{(L)}$ is the number of PDCCH candidates the UE is configured to monitor for aggregation level L of the search space set s for a serving cell corresponding to n_CI; for any CSS, $M_{s,max}^{(L)}=M_{s,0}^{(L)}$; for a USS, $M_{s,max}^{(L)}$ is the maximum of $M_{s,n\_CI}^{(L)}$ over all configured n_CI values for a CCE aggregation level L of search space set s. $m_{s,n\_CI}$ is an index of a PDCCH candidate the UE configured to monitor per aggregation level L of the search space set s.

Here, in a CORESET associated with a search space set s, a set of CCEs for AL L are those determining CCE indexes where the PDCCH candidates, the UE 102 is configured to monitor for AL L of the search space set, are placed. Here, a set of CCEs for AL L can also refer to a USS. That is, a search space set s may comprise of one or more corresponding sets of CCEs for respective AL L. A set of CCEs can also refer to as 'a USS'. A set of CCEs for AL L can also refer to 'a USS at AL L'.

As above-mentioned, the UE 102 may receive, from the base station 160, a RRC message including one or more RRC parameters related to search space configuration. The UE 102 may determine PDCCH monitoring occasions for PDCCH candidates for each search space set s based on the received the RRC parameters. The UE 102 may monitor PDCCH candidates for each search space set s in the determined PDCCH monitoring occasions. For example, a RRC parameter (e.g. SearchSpace) may provide the UE 102 for a search space set s, that a PDCCH monitoring periodicity of $k_s$ slots, a PDCCH monitoring offset of $o_s$ slots, a duration of $T_s$, a PDCCH monitoring pattern within a slot, and so on.

Figure 3:
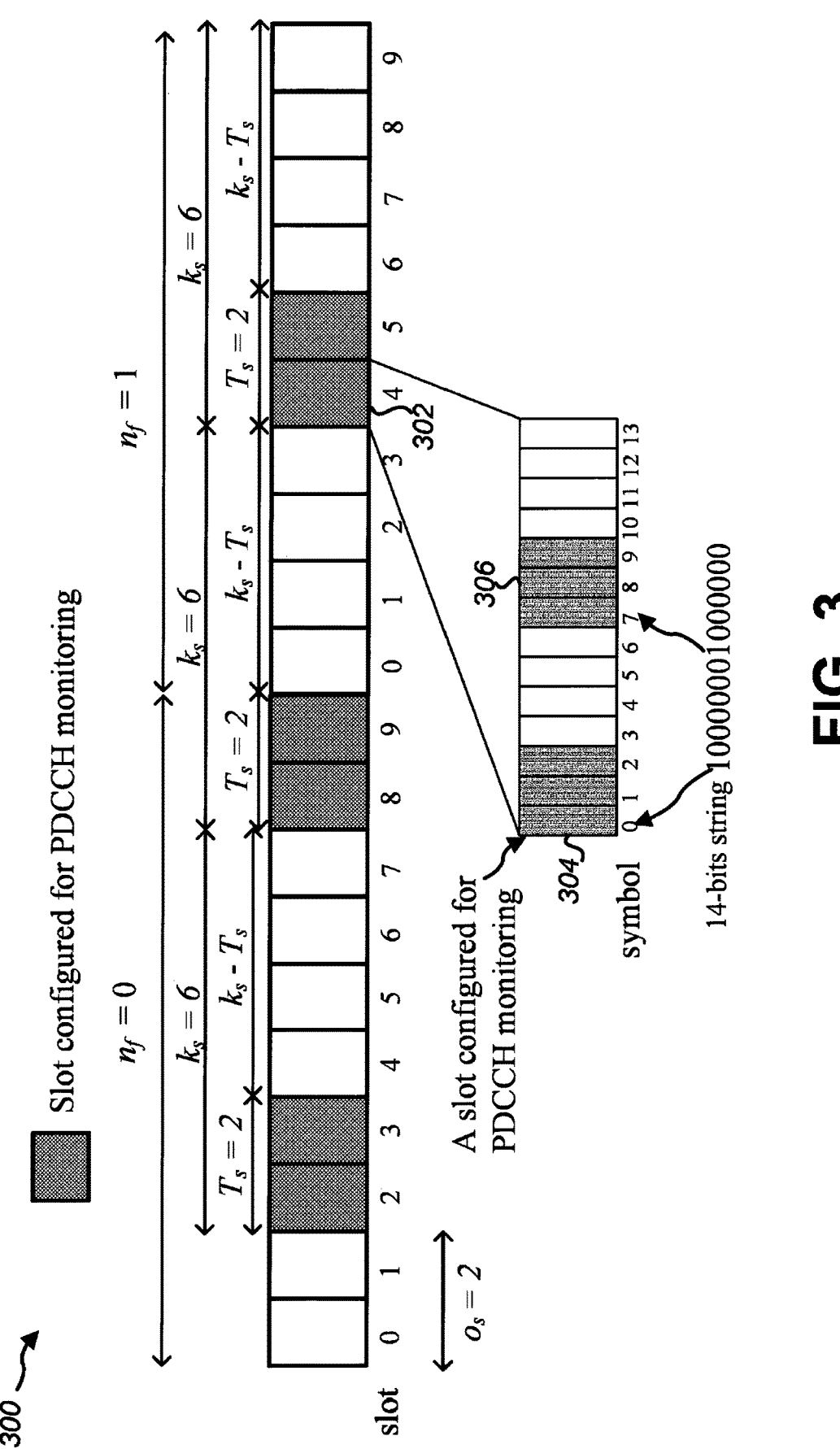
FIG. 3 is a diagram illustrating one example 300 how to determine PDCCH monitoring occasions for PDCCH candidates based on corresponding search space set configuration and CORESET configuration.

In order to monitor a set of PDCCH candidates of a search space set, the UE may determine PDCCH monitoring occasions according to the search space set configuration and associated CORESET configuration. FIG. 3 is a diagram illustrating one example 300 how to determine PDCCH monitoring occasions for PDCCH candidates based on corresponding search space set configuration and CORESET configuration.

In FIG. 3, the PDCCH monitoring periodicity $k_s$ is configured as 6 slots. The PDCCH monitoring offset $o_s$ is configured as 2 slots. The duration $T_s$ is configured as 2 slots. The subcarrier spacing configuration u is configured as 0, which means the subcarrier spacing of the active DL BWP is 15 kHz. In this case u=0, $N^{frame,u}_{slot}$ is equal to 10. That is, in a case u=0, the number of slots per frame is 10. $n^u_{s,f}$ is the slot number within a radio frame. That is, the value of $n^u_{s,f}$ is in a range of {0, . . . , $N^{frame,u}_{slot}-1$}.

The UE 102 may determine a PDCCH monitoring occasion on an active DL BWP from the PDCCH monitoring periodicity, the PDCCH monitoring offset, and the PDCCH monitoring pattern within a slot for each configured search space set s. For a search space set s, the UE 102, if the slot with number $n^u{}_sf$ satisfies Formula (1) $(n_f*N^{frame,u}{}_{slot}+n^u{}_{s,f}-o_s)$ mod $k_s=0$, may determine that a PDCCH monitoring occasion(s) exists in a slot with number $n^u{}_{s,f}$ in a frame with number $n_f$. According to Formula (1), the UE 102 may determine the slots with number $n^u{}_{s,f}=2$ and $n^u{}_{s,f}=8$ in a frame with number $n_f=0$ and the slot with number $n^u{}_{s,f}=4$ in a frame with number $n_f=1$ as the slots in which the PDCCH monitoring occasions exists. Given the $T_s$ is configured as 2 slots, the UE 102 may monitor PDCCH candidates for search space set s for $T_s=2$ consecutive slots, starting from the determined the slots with number $n^u{}_{s,f}$. In other words, the UE 102 may not monitor PDCCH candidates for search space set s for the next $(k_s-T_s)$ consecutive slots. As depicted in FIG. 3, the UE 102 may determine the slots with number $n^u{}_{s,f}=2$, 3, 8, and 9 in a frame with number $n_f=0$ and the slots with number $n^u{}_{s,f}=4$, and 5 in a frame with number $n_f=1$ as the slots having PDCCH monitoring occasions. The UE 102 may monitor PDCCH candidates for search space set s in the determined slots configured for PDCCH monitoring. A slot having PDCCH monitoring occasions may also refer to a slot configured for PDCCH monitoring.

Furthermore, a slot determined (or configured) for PDCCH monitoring may have one or more than one PDCCH monitoring occasions. PDCCH monitoring pattern within the slot configured for PDCCH monitoring is indicated by a 14-bits string (monitoringSymbolsWithinSlot). Each bit within the 14-bits string may correspond to a symbol within a slot, respectively. The most significant (left) bit (MSB) may represent the first OFDM in a slot, and the second most significant (left) bit may represent the second OFDM symbol in a slot and so on. The bit(s) set to one may identify the first OFDM symbol(s) of the control resource set within a slot. As depicted in FIG. 3, a slot 302 configured for PDCCH monitoring may have two PDCCH monitoring occasions. The first PDCCH monitoring occasion 304 is located on the first, second and third consecutive symbols. The second PDCCH monitoring occasion 306 is located on the $8^{th}$, $9^{th}$, and $10^{th}$ consecutive OFDM symbols. The duration of one PDCCH monitoring occasion is equal to the duration of a CORESET associated with the search space set s. Generally, the duration of one PDCCH monitoring occasion (the number of the consecutive OFDM symbols for one PDCCH monitoring occasion) can be 1, 2 or 3 symbols. In the FIG. 3, a CORESET comprises one PDCCH monitoring occasion with 3 consecutive ODM symbols in the time domain.

According to the FIG. 3, the UE may monitor a set of PDCCH candidates for the search space set s in the first PDCCH monitoring occasion 304 in the associated CORESET and may further monitor a set of PDCCH candidates for the search space set s in the second PDCCH monitoring occasion 306 in the CORESET in each slot in which the PDCCH monitoring is configured for the search space set s. Here, each PDCCH candidate for the search space set s is mapped in a resource of the associated CORESET in each PDCCH monitoring occasion. In other words, one PDCCH candidate for the search space set s is mapped to one associated CORESET in one PDCCH monitoring occasion. One PDCCH candidate for the search space set s is not mapped to more than one associated CORESET in different PDCCH monitoring occasions. For example, one PDCCH candidate for the search space set s is not mapped to both the first PDCCH monitoring occasion 304 and the second PDCCH monitoring occasion 306.

For some new type UE which may have less reception antennas or reduced RF bandwidth compared to the Release 15/16 UE, some performance as like the coverage, or the reliability of PDCCH/PDSCH reception would be affected. Solutions as like to repeat the PDCCH candidate transmission or to utilize more resource of a CORESET to map one PDCCH candidate would be necessary for improve the coverage for PDCCH transmission and the PDCCH reception reliability. PDCCH candidate repetition in different time domain in a same CORESET, which also results in a lower code rate of PDCCH reception, would be beneficial for the new type UE (with reduced capability compared to the Release 15/16 UE) to achieve reliable PDCCH reception and enhance the coverage. For PDCCH candidate repetition, the UE would soft-combine the repeated PDCCH candidates and perform the channel coding for the PDCCH candidate. Hereinafter, the new type UE with reduced capability compared to the Release 15/16 UE can also refer to as 'RedCap UE'.

In various implementations of the present disclosure, 'PDCCH repetition' refers to 'a PDCCH candidate repetition'. 'a PDCCH candidate' herein refers to 'a PDCCH candidate for a DCI format'. 'a PDCCH candidate repetition' implies a PDCCH candidate with a same CCE aggregation level L for a same DCI format of a same search space set s is repeated in one or more PDCCH monitoring occasions in a same CORESET associated with the search space set s. Furthermore, 'a PDCCH candidate is repeated' means 'a PDCCH candidate with a same index $m_{s,n\_CI}$ is repeated'. That is, each PDCCH candidate for repetition may carry same downlink control information (or, same payload size, same information bits). Furthermore, the CCE indexes corresponding to each PDCCH candidate for repetition are same.

According to the FIG. 2, a CORESET in the time domain comprises one set of consecutive OFDM symbols (also referred as to one PDCCH monitoring occasion in the time domain) with 1, 2 or 3 symbols. In the present disclosure, a UE may monitor a PDCCH candidate of a search space set in a set of one or more PDCCH monitoring occasions (one or more set of consecutive OFDM symbols) in a CORESET. These PDCCH monitoring occasions can be consecutive or non-consecutive in the time domain.

In various implementations of the present disclosure, each PDCCH candidate with a same index for a search space set s is repeated in one or more PDCCH monitoring occasions in a (same) CORESET associated with the search space set s. Furthermore, 'one or more PDCCH monitoring occasions in a (same) CORESET' may refer to as 'one or more PDCCH monitoring occasions in one or more CORESETs with the same index configured by RRC parameter related to CORESET configuration'. 'one or more PDCCH monitoring occasions in a (same) CORESET' may be considered since one frequency domain resource is defined by an index of a CORESET configuration. However, since the CORESET configuration includes a duration of a CORESET and each of one or more PDCCH monitoring occasions has the duration, 'one or more PDCCH monitoring occasions in one or more CORESETs with the same index configured by RRC parameter related to CORESET configuration' may be appropriate in some case.

By repeating one PDCCH candidate (i.e. By repeating one PDCCH) in one or more PDCCH monitoring occasions, more resource are used for transmission of each PDCCH candidate and the soft-combination of the repeated PDCCH candidate results in a lower code rating of the PDCCH, which eventually improve the PDCCH reception reliability and coverage.

Each PDCCH for a first search space set is transmitted in one PDCCH monitoring occasion and could be repeated in one or more PDCCH monitoring occasions. The base station 160 may repeat each PDCCH in one or more PDCCH monitoring occasions. The UE 102 may monitor each PDCCH repeated in one or more PDCCH monitoring occasions.

A slot format includes downlink symbols, uplink symbols, and the flexible symbols. For each serving cell, the UE 102 may be provided a RRC parameter (e.g., a cell specific RRC parameter tdd-UL-DL-ConfigurationCommon). The UE 102 may set the slot format per slot over a number of slots based on the RRC parameter tdd-UL-DL-ConfigurationCommon. That is, the RRC parameter tdd-UL-DL-ConfigurationCommon is used to determine the cell specific Uplink/Downlink TDD configuration.

The UE 102 may be additionally provided a RRC parameter (e.g., a UE-specific RRC parameter tdd-UL-DL-ConfigurationDedicated). The RRC parameter tdd-UL-DL-ConfigurationDedicated is used to determine the UE-specific Uplink/Downlink TDD configuration. The UE 102 may use tdd-UL-DL-ConfigurationDedicated to override the only flexible symbols per slot over the number of slots as provided by tdd-UL-DL-ConfigurationCommon. To be more specific, for the flexible symbols provided by the tdd-UL-DL-ConfigurationCommon, the UE 102 may further determine these flexible symbols as downlink or uplink based on the tdd-UL-DL-ConfigurationDedicated. Alternatively, for the flexible symbols provided by the tdd-UL-DL-ConfigurationCommon, the UE 102 may not further determine these flexible symbols as downlink or uplink based on the tdd-UL-DL-ConfigurationDedicated. In other words, for the flexible symbols provided by the tdd-UL-DL-ConfigurationCommon but not determined as downlink or uplink based on the tdd-UL-DL-ConfigurationDedicated, the UE 102 may still determine these flexible symbols as flexible (flexible symbols).

In the present disclosure, 'slot format determined based on the tdd-UL-DL-ConfigurationCommon and/or the tdd-UL-DL-ConfigurationDedicated' can also refer to as 'slot format determined based on RRC parameter(s)'. The slot format configuration provided by the tdd-UL-DL-ConfigurationCommon and/or the tdd-UL-DL-ConfigurationDedicated' can be regarded as the higher layer slot format configuration (or higher layer slot format configuration information).

In the present disclosure, besides transmitting the RRC parameters to indicate the slot format (or slot configuration), the base station 160 also may transmit, to the UE 102, a DCI format (e.g. DCI format 20) to set the slot format for one or more slots. The DCI format 2_0 includes one or more slot format indicator fields. Each slot format indicator field can provide a slot format value. The slot format value in a DCI format 2_0 indicates to a UE a slot format for each slot in a number of slots for each DL BWP or each UL BWP starting from a slot where the UE 102 detects the DCI format 2_0. The UE 102 may detect a DCI format 2_0 and set a slot format for each slot by using the corresponding slot format value(s) indicated by the DCI format 2_0. Slot format can be provided by a predefined slot format table.

FIG. 4 is a diagram illustrating one example 400 of a slot format table. A slot format is identified by a corresponding slot format value (or slot format index) as provided in the FIG. 4 where 'D' denotes a downlink symbol, 'U' denotes an uplink symbols, and 'F' denotes a flexible symbols. For each slot format, 'symbol number in a slot' corresponds to a symbol whose index is from 0 to 13 in a slot. For example, the UE 102 may detect a DCI format 2_0 with a slot format value. Then, by referring to FIG. 4, the UE 102 can set a slot format with the corresponding slot format value for a slot. As shown in FIG. 4, a slot format value with 255 does not directly indicate a specified slot format for a slot. That is, in a case where the UE 102 detects a DCI format 2_0 with a slot format value with 255, the UE 102 may determine slot format for a slot based on the higher layer slot format configuration.

For a set of symbols of a slot that are indicated as downlink/uplink by the tdd-UL-DL-ConfigurationCommon, and/or the tdd-UL-DL-ConfigurationDedicated, the UE 102 may not detect a DCI format with a slot format value indicating the set of symbols as uplink/downlink, respectively, or as flexible. In other words, only for a set of symbols of a slot that are indicated as flexible by tdd-UL-DL-ConfigurationCommon, and/or the tdd-UL-DL-ConfigurationDedicated, the UE 102 may detect a DCI format with a slot format value indicating the set of symbols as downlink, uplink, or flexible. That is, the UE 102 may use a slot format value indicated by a DCI format 2_0 to override the only flexible symbols of a slot provided by tdd-UL-DL-ConfigurationCommon, and/or the tdd-UL-DL-ConfigurationDedicated. The UE 102 may determine (or set) a set of flexible symbols of a slot provided by tdd-UL-DL-ConfigurationCommon, and/or the tdd-UL-DL-ConfigurationDedicated as downlink, uplink, or flexible.

Additionally or alternatively, a UE 102 may not be configured by the base station 160 to monitor PDCCH for DCI format 2_0 on a serving cell. In this case, the UE 102 may determine the slot format per slot over a number of slots as indicated by the tdd-UL-DL-ConfigurationCommon, and/or the tdd-UL-DL-ConfigurationDedicated.

In the present disclosure, for a slot, the slot format is determined based on the RRC parameters (e.g. tdd-UL-DL-ConfigurationCommon, and/or the tdd-UL-DL-ConfigurationDedicated) and/or the DCI format (e.g. the DCI format 2_0).

Figure 5:
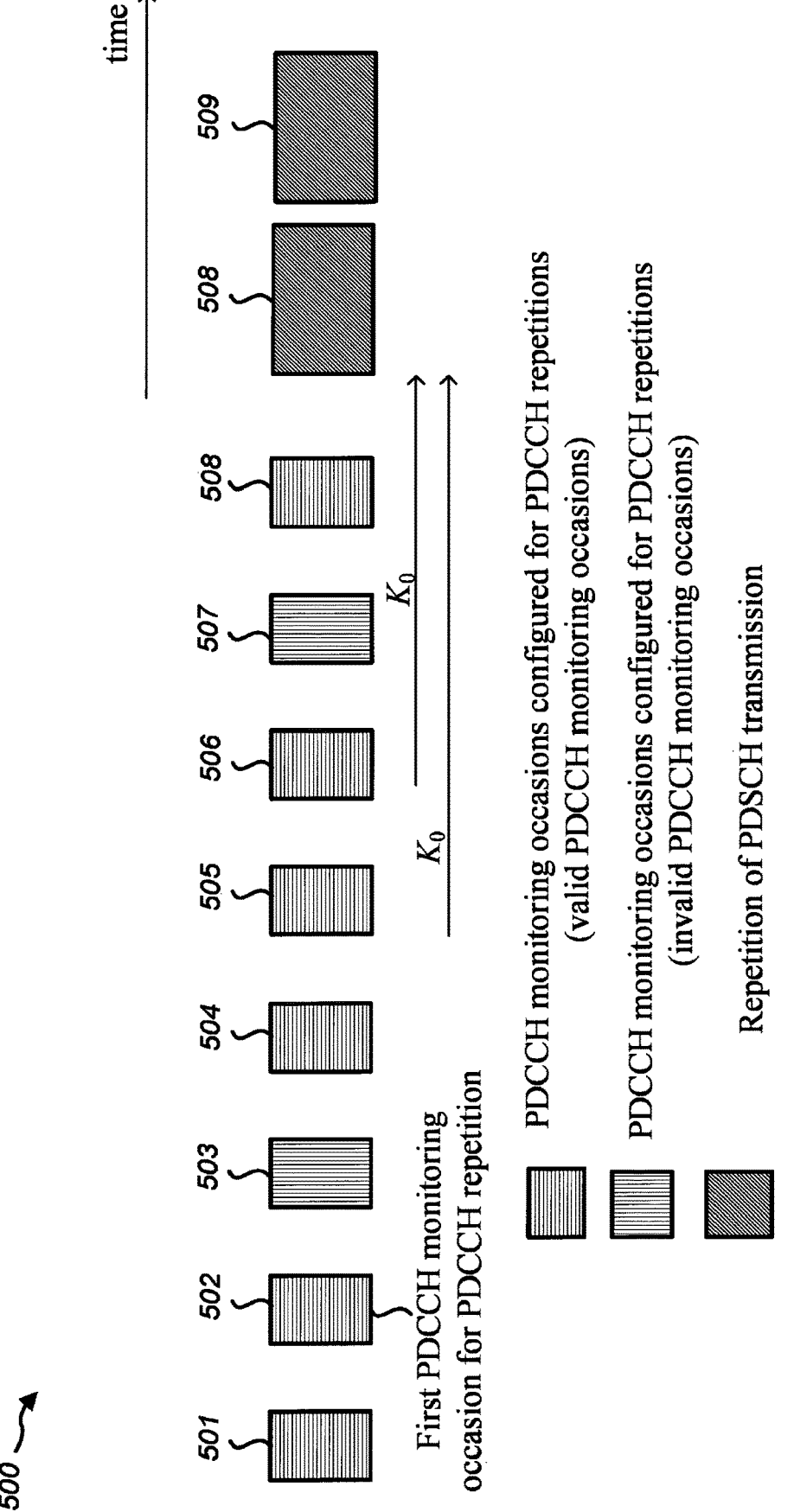
FIG. 5 is a flow diagram illustrating one implementation of a method 500 for determining PDCCH repetition and a starting slot of a PDSCH transmission received by a UE 102.

FIG. 5 is a flow diagram illustrating one implementation of a method 500 for determining PDCCH repetition and a starting slot of a PDSCH transmission received by a UE 102.

In the implementation of the present disclosure, a UE 102 may receive 502, from a base station 160, first information indicating a slot format and second information indicating a maximum number of PDCCH repetitions. A slot format includes downlink symbols, uplink symbols, and flexible symbols. The first information indicates to the UE 102 a slot format per each slot. The UE 102 may set the slot format per slot based on the first information. That is, the UE 102 may determine, based on the first information, a set of symbols in per slot as downlink symbols, uplink symbols, or flexible symbols. The base station 160 may determine the slot format per slot and generate the RRC parameters and/or DCI format to indicate a slot format per slot to the UE 102. The UE 102 is provided the second information by RRC parameters and/or DCI format. For example, for a set of symbols that are indicated to the UE 102 as uplink symbols, the UE 102 does not monitor a PDCCH repetition in a PDCCH monitoring occasion which may overlap or partially overlap with the set of symbols.

Additionally or alternatively, besides indicating a slot format, the first information may also indicate invalid symbols to the UE 102. The UE 102 may not perform DL reception and/or UL transmission in those symbols indicated as invalid symbols. For example, the UE 102 may not receive (monitor) a PDCCH repetition in a PDCCH monitoring occasion if at least one symbol of the PDCCH monitoring occasion is indicated as invalid symbol(s) by the first information.

At 502, the UE 102 may monitor PDCCH repetitions based on the second information for a first search space set in a first CORESET. The UE 102 is configured with the first search space set and the first CORESET by respective corresponding RRC parameter. The first CORESET is associated with the first search space set. Specifically, the UE 102 may receive a RRC parameter SearchSpace related to the first search space set. The RRC parameter SearchSpace defines how and where to search for PDCCH candidates for a DCI format for the first search space set. The UE 102 may be provided with e configured by respective corresponding RRC parameters ControlResourceSet. The UE 102 may receive a RRC parameter ControlResourceSet related to the first CORESET. The RRC parameter ControlResourceSet configures a time and frequency control resource set in which to search for downlink control information. Different CORESETs are configured by respective corresponding RRC parameters ControlResourceSet.

The maximum number of PDCCH repetitions indicated by the second information is a maximum repetition number that the UE is configured to monitor PDCCH. In the present disclosure, a UE 102 may be provided one maximum number of PDCCH repetition or more than one maximum number of PDCCH repetition. If a maximum number of PDCCH repetition is applied to repetitions of a PDCCH transmission, the base station 160 may repeatedly transmit a PDCCH candidate with a repetition number being equal to or less than the maximum number of PDCCH repetition. If a repetition number of a PDCCH transmission reaches to the maximum number of PDCCH repetition, the base station 160 may not further transmit the repetition of the PDCCH transmission and the UE may not further monitor the repetition of the PDCCH transmission.

In an example, a UE 102 may be only provided one maximum number of PDCCH repetition by the second information. That is, the maximum number of PDCCH repetition is applied to one or more CORESETs configured to the UE 102 by the corresponding one or more RRC parameters controlResourceSet. The maximum number of PDCCH repetition is a common number for PDCCH repetition in the one or more configured CORESETs.

In an example, The UE may be provided more than one maximum numbers of PDCCH repetition by the second information. In this case, the UE may further determine, based on a received RRC parameter (or a DCI format), which one of the more than one maximum numbers of PDCCH repetition is applied to the PDCCH repetitions for the first search space set. Furthermore, a RRC parameter included in the RRC parameter SearchSpace can be used to directly indicate a maximum number of PDCCH repetition. Then the maximum number of PDCCH repetition is applied to PDCCH repetition transmission for the search space set. Thus, according to this way, different maximum numbers of PDCCH repetition can be configured for PDCCH repetition for different search space sets. Alternatively, a RRC parameter included in the RRC parameter ControlResourceSet can be used to directly indicate a maximum number of PDCCH repetition. Then the maximum number of PDCCH repetition is applied to PDCCH repetition transmission in the CORESET. For example, a first maximum number of PDCCH repetition can be configured for a first CORESET, while a second maximum number of PDCCH repetition can be configured for a second CORESET. Thus, according to this way, different maximum numbers of PDCCH repetition can be configured for PDCCH repetition for different CORESETs. In the meantime, the same maximum number of PDCCH repetition can be applied to one or more search space sets associated with the CORESET.

Through this kind of indication by the RRC parameter, the base station 160 is capable of configuring the UE 102 different maximum numbers of PDCCH repetition for different search space sets or different CORESETs.

As above-mentioned at 502, the UE 102 is configured to monitor PDCCH repetitions based on the second information for a first search space set in a first CORESET. To be specific, the UE 102 may determine, based on the second information and the received RRC parameters (e.g. SearchSpace and ControlResourceSet), PDCCH monitoring occasions configured for PDCCH repetitions. For example, the UE 102 may first determine, based on the received RRC parameter SearchSpace and/or the RRC parameter ControlResourceSet, a first PDCCH monitoring occasion configured for a first one of repetitions of a PDCCH transmission. Then, the PDCCH (each PDCCH candidate) is repeated in a set of consecutive PDCCH monitoring occasions starting with the first PDCCH monitoring occasion. The total number of the set of consecutive PDCCH monitoring occasions is equal to or less than the maximum number of PDCCH repetition. The determination of PDCCH monitoring occasions for the first search space set is illustrated in the FIG. 3.

The UE 102 may 504 determine, based on the first information, whether each configured PDCCH repetition of the PDCCH repetitions is transmitted or not. In other words, the UE 102 may determine, based on the first formation, whether some PDCCH monitoring occasions in the set of consecutive PDCCH monitoring occasions can be used for reception of PDCCH repetitions. To be specific, for each PDCCH monitoring occasion in the set, the UE 102 may determine, based on the first information, whether the PDCCH monitoring occasion can be used for reception of PDCCH repetition. That is, for each PDCCH repetition in the set of consecutive PDCCH monitoring occasions, the UE 102 may determine, based on the first information, whether to omit monitoring a PDCCH repetition. For example, if at least one or more symbol of a PDCCH monitoring occasion overlap with one or more symbols indicated as uplink symbol (or invalid symbol) by the first information, the UE 102 may determine the PDCCH monitoring occasion as an inapplicable PDCCH monitoring occasion for reception of PDCCH repetition. For example, if a set of symbols of which a PDCCH monitoring occasion consists only overlap with any symbols only indicated as downlink symbol (or valid symbol) by the first information, the UE 102 may determine the PDCCH monitoring occasion as an applicable PDCCH monitoring occasion for reception of PDCCH repetition. In other words, if any symbols of a PDCCH monitoring occasion do not overlap with any symbols indicated as uplink symbol (or invalid symbol) by the first information, the UE 102 may determine the PDCCH monitoring occasion as an applicable PDCCH monitoring occasion for reception of PDCCH repetition.

If the UE 102 determines a PDCCH monitoring occasion as an applicable (or valid, or available) PDCCH monitoring occasion for reception of PDCCH repetition, the UE 102 may monitor PDCCH repetition in the PDCCH monitoring occasion. If the UE 102 determines a PDCCH monitoring occasion as an inapplicable (or invalid, or unavailable) PDCCH monitoring occasion for reception of PDCCH repetition, the UE 102 may not monitor (detect, or receive) PDCCH repetition in the PDCCH monitoring occasion. The base station 160 may transmit a PDCCH repetition in an applicable PDCCH monitoring occasion and may not transmit a PDCCH repetition in an inapplicable PDCCH monitoring occasion.

FIG. 6 illustrates one example 600 for determining PDCCH repetition and PDSCH transmission by a UE 102.

In the FIG. 6, the UE 102 may determine the PDCCH monitoring occasions for the first search space set in the first CORESET as illustrated in the FIG. 3. The determined PDCCH monitoring occasions are 601, 602, 603, 604, 605, 606, 607, 608. The maximum number of PDCCH repetition for the first search space set herein is indicated to the UE as 6. The UE 102 may further determine the PDCCH monitoring occasion 602 as the first PDCCH monitoring occasion for PDCCH repetition. The UE 102 may assume that the PDCCH is repeated in 6 consecutive PDCCH monitoring occasions starting with the first PDCCH monitoring occasion 602. That is, the PDCCH monitoring occasions 602, 603, 604, 605, 606, 607 are a set of PDCCH monitoring occasions configured for PDCCH repetition. The set of PDCCH monitoring occasions are used for reception of PDCCH repetitions. Based on the first information, the UE 102 may determine PDCCH monitoring occasions 602, 604, 605, 606 as applicable PDCCH monitoring occasions and determine PDCCH monitoring occasions 603, 607 as inapplicable PDCCH monitoring occasions. The base station 160 may repeat each PDCCH transmission in the PDCCH monitoring occasions 602, 604, 605, 606 and may not repeat the PDCCH transmission in the PDCCH monitoring occasions 603, 607. The UE 102 may attempt to monitor PDCCH repetition transmission in the PDCCH monitoring occasions 602, 604, 605, 606 and may omit monitoring PDCCH repetition transmission in the PDCCH monitoring occasions 603, 607.

In the implementation of the present disclosure, a UE 102 may not receive the PDCCH repetitions in all applicable PDCCH monitoring occasions in the set. That is, the UE 102 may be not necessary to soft-combine all the PDCCH repetitions in the all applicable PDCCH monitoring occasions in the set and then perform the decoding for the PDCCH.

In an example, the UE 102 may orderly perform decoding for each PDCCH repetition in the set of PDCCH monitoring occasions. The UE 102 may perform decoding the PDCCH repetition received in the first PDCCH monitoring occasion in the set. If the UE 102 successfully decoded the PDCCH, the UE 102 may terminate the reception of the PDCCH repetition in the subsequent PDCCH monitoring occasions in the set. If the UE 102 did not successfully decode the PDCCH, the UE 102 may further receive a PDCCH repetition in a PDCCH monitoring occasion followed the first PDCCH monitoring occasion and decode it. The UE 102 may soft-combine these two received PDCCH repetitions and perform decoding for the PDCCH. The UE 102 may continue to receive and decode a PDCCH repetition in a PDCCH monitoring occasion in the set and, if failed to successfully decode the PDCCH repetition, the UE 102 may soft-combine it with previously received PDCCH repetitions until the UE successfully decode the PDCCH. By this way, the UE may early decode the PDCCH.

At 504, upon detection of the PDCCH carrying downlink control information (DCI), the UE 102 may decode the corresponding PDSCH as indicated by the DCI. The DCI includes third information indicating a first number and forth information indicating timing of the PDSCH. The first number is used to indicate to the UE 102 that the base station 160 may transmit PDCCH repetitions in the first number PDCCH monitoring occasions in the set and may not further transmit PDCCH repetitions in the remaining PDCCH monitoring occasions in the set. In other words, the base station 160 may repeat each PDCCH (each PDCCH candidate) across the first number consecutive PDCCH monitoring occasions in the set and may not repeat each PDCCH in the remaining PDCCH monitoring occasions in the set. The first number consecutive PDCCH monitoring occasions may include one or more applicable PDCCH monitoring occasions and zero, one or more inapplicable PDCCH monitoring occasions. The UE 102 counts a PDCCH monitoring occasions starting from the first PDCCH monitoring occasion in the first number. For example, in the FIG. 6, the third information indicates the first number as 4. The UE counts the PDCCH monitoring occasions 602, 603, 604, 605 in the first number. However, the UE 102 may monitor PDCCH repetitions in the PDCCH monitoring occasions 602, 604, 605 and may not monitor PDCCH repetitions in other PDCCH monitoring occasions in the set. The base station 160 may repeat PDCCH transmission in the PDCCH monitoring occasions 602, 604, 605 and may not transmit PDCCH repetitions in other PDCCH monitoring occasions in the set. The PDCCH monitoring occasion 605 is the last one PDCCH repetition of the PDCCH repetitions with the first number. The actual repetition number of PDCCH transmitted by the base station 160 is equal to or less than the first number.

Additionally or alternatively, in some cases, the first number of the PDCCH monitoring occasions in the set may only include one or more applicable PDCCH monitoring occasions and may not include an inapplicable PDCCH monitoring occasion. The UE 102 counts a PDCCH monitoring occasion in the first number when the PDCCH monitoring occasion is an applicable PDCCH monitoring occasion and does not count a PDCCH monitoring occasion in the first number when the PDCCH monitoring occasion is an inapplicable PDCCH monitoring occasion. For example, in the FIG. 6, the third information indicates the first number as 4. The UE counts the PDCCH monitoring occasions 602, 604, 605, 606 in the first number. The UE 102 may monitor PDCCH repetitions in the PDCCH monitoring occasions 602, 604, 605, 606 and may not monitor PDCCH repetitions in other PDCCH monitoring occasions in the set. The base station 160 may repeat PDCCH transmission in the PDCCH monitoring occasions 602, 604, 605, 606 and may not transmit PDCCH repetitions in other PDCCH monitoring occasions in the set. The PDCCH monitoring occasion 606 is the last one PDCCH repetition of the PDCCH repetitions with the first number. The actual repetition number of PDCCH transmitted by the base station 160 is equal to the first number.

Additionally or alternatively, in some cases, the first number of the PDCCH monitoring occasions in the set may only include one or more applicable PDCCH monitoring occasions and may include zero, one or more inapplicable PDCCH monitoring occasions which are determined as inapplicable PDCCH monitoring occasions based on the first information provided by RRC parameter. That is, the UE 102 does not count a PDCCH monitoring occasion in the first number if the UE 102 determined the PDCCH monitoring occasion an inapplicable PDCCH monitoring occasion based on the first information provided by the DCI format. For example, in the FIG. 6, the third information indicates the first number as 4. If the PDCCH monitoring occasion 603 is determined as an inapplicable PDCCH monitoring occasion based on the first information provided by RRC parameters, the UE counts the PDCCH monitoring occasions 602, 603, 604, 605 in the first number. The PDCCH monitoring occasion 605 is the last one PDCCH repetition of the PDCCH repetitions with the first number. If the PDCCH monitoring occasion 603 is determined as an inapplicable PDCCH monitoring occasion based on the first information provided by DCI format, the UE counts the PDCCH monitoring occasions 602, 604, 605, 606 in the first number. The PDCCH monitoring occasion 606 is the last one PDCCH repetition of the PDCCH repetitions with the first number. The actual repetition number of PDCCH transmitted by the base station 160 is equal to or less than the first number.

Timing of PDSCH indicated by the forth information may be a slot offset between a first slot and a starting slot of the scheduled PDSCH. If the DCI does not include the forth information, the UE may apply 0 as the value of the slot offset.

The UE 102 may 506 determine, based on the third information, a first slot in which the last one PDCCH repetition of the PDCCH repetitions with the first number is located. Herein, the first slot is determined based on the first number rather than the maximum number of PDCCH repetition. According to the above-mentioned various cases, the base station 160 may or may not transmit a PDCCH repetition in the last one PDCCH repetition of the PDCCH repetitions with the first number in the first slot. The UE 102 may or may not receive a PDCCH repetition in the last one PDCCH repetition of the PDCCH repetitions with the first number in the first slot.

In other words, as mentioned above, in some cases where last one PDCCH repetition of the PDCCH repetitions with the first number is configured to be monitored in an inapplicable PDCCH monitoring occasion, the UE 102 may determine a subsequent PDCCH monitoring occasion in the set as the last one PDCCH repetition of the PDCCH repetitions with the first number wherein the subsequent PDCCH monitoring occasion is an applicable PDCCH monitoring occasion. If the last one PDCCH repetition of the PDCCH repetitions with the first number is already a last one PDCCH repetition of the PDCCH repetitions with the maximum number of PDCCH repetition, the UE 102 may determine this one as the last one PDCCH repetition, regardless of whether the last one PDCCH repetition is configured to be monitored in an applicable PDCCH monitoring occasion or an inapplicable PDCCH monitoring occasion.

The UE 102 may 508 determine a starting slot of a PDSCH transmission based on the forth information and the first slot. To be more specific, the slot allocated for the PDSCH transmission (i.e. the starting slot of the PDSCH transmission) is determined based on Formula (2) Floor $(n*2^{\mu_{PDSCH}}/2^{\mu_{PDCCH}})+K_0$, where the n is the first slot, $K_0$ indicated by the forth information is a slot offset based on the numerology of the PDSCH, and the $\mu_{PDSCH}$ and $\mu_{PDCCH}$ are the subcarrier spacing configurations for PDSCH and PDCCH, respectively. $K_0$ is a slot offset between the first slot and the starting slot of the PDSCH transmission.

The slot n may be the last slot with the scheduling DCI where the scheduling DCI is configured to be monitored. The scheduling DCI is carried by the PDCCH repetition with the first number. In other words, the last slot is a slot where the last one PDCCH repetition of the PDCCH repetitions with the first number is configured to be monitored. However, according to the above-mentioned various cases, the base station 160 may or may not transmit the last one PDCCH repetition in the last slot. The UE 102 may or may not receive the last one PDCCH repetition in the last slot.

Additionally or alternatively, the slot n may be the last slot with the scheduling DCI where the scheduling DCI is transmitted. The scheduling DCI is carried by the PDCCH repetition with the first number. In other words, the last slot is a slot where the last one PDCCH repetition of the PDCCH repetitions with the first number is transmitted.

As illustrated in the FIG. 6, the starting slot where the PDSCH 608 is allocated is determined based on the forth information and the first slot. The first slot is a slot in which the last one PDCCH repetition of the PDCCH repetitions with the first number is located. According to the above-mentioned various cases, the first slot may be a slot in which the PDCCH monitoring occasion 605 (i.e. the last one PDCCH repetition of the PDCCH repetitions with the first number) is located. Alternatively, according to the above-mentioned various cases, the first slot may be a slot in which the PDCCH monitoring occasion 606 (i.e. the last one PDCCH repetition of the PDCCH repetitions with the first number) is located.

In the implementation, the first number is indicated by the DCI. Thus, the base station 160 may, according to the UE's channel condition, adjust the value of the first number which can be lower than or equal to the indicated maximum number of PDCCH repetition. The base station 160 is not necessary to always transmit the PDCCH repetition with the maximum number of PDCCH repetition. The UE 102 may first assume a lower repetition number (e.g. 1) to receive the PDCCH repetitions. The UE 102 may gradually increment the repetition number to further receive the PDCCH repetitions, then soft-combine the received PDCCH repetitions, and perform decoding until the UE 102 successfully decoded the PDCCH. After successfully decoding the PDCCH, the UE 102 may determine the first number indicated by the DCl. The base station 160 may terminate the PDCCH repetition transmission after the first number PDCCH repetitions even if the indicated first number is lower than the maximum number of PDCCH repetition. The UE 102 may terminate the reception of the PDCCH repetition after successfully decoding the PDCCH and may skip monitoring the remaining PDCCH repetition transmitted by the base station 160.

The UE 102 may assume a lower repetition number to monitor the PDCCH repetitions in the lower repetition number of the consecutive PDCCH monitoring occasions. Regarding the assumption of the lower repetition number for PDCCH repetition monitoring, the UE 102 may attempt to monitor the PDCCH repetition with the lower repetition number. However, for a PDCCH repetition configured to be monitored in an inapplicable PDCCH monitoring occasion, the UE 102 may omit monitoring the PDCCH repetition.

Alternatively, the UE 102 may assume a lower repetition number to monitor the PDCCH repetitions. The UE 102 may specify, based on the assumed lower repetition number and the first information, the repetition number of the PDCCH transmission configured to be monitored in those applicable PDCCH monitoring occasions. That is, the UE 102 may attempt to decode PDCCH repetitions configured to be monitored in those applicable PDCCH monitoring occasions. The base station 160 may repeat the PDCCH in those applicable PDCCH monitoring occasions. The UE 102 may monitor these PDCCH repetitions transmitted in the applicable PDCCH monitoring occasions.

An illustration of mapping of PDCCH repetition field values to a PDCCH repetition number corresponding to a maximum number of PDCCH repetition is described below. FIG. 7 illustrates one example 700 of mapping of PDCCH repetition field values to a PDCCH repetition number corresponding to a maximum number of PDCCH repetition. In FIG. 7, the UE 102 is provided with two maximum numbers of PDCCH repetition as X and Y. As above-mentioned, the UE 102 may determine either X or Y to apply to a PDCCH repetition.

The DCI includes third information indicating a first number. To be more specific, a DCI field included in the DCI indicates the first number. The DCI field values map to values of the first number, as defined in FIG. 7. FIG. 7 (*a*) is an example of mapping for the DCI field of 1 bit. FIG. 7 (*b*) is an example of mapping for the DCI field of 2 bits.

In FIG. 7 (*a*), in a case where X is determined as the maximum number of PDCCH repetition for PDCCH transmission, DCI field values '0', '1' map to values of the first number X10, X11, respectively. The value of X10 is less than the value of X11. The value of X11 is equal to or less than the value of X. In a case where Y is determined as the maximum number of PDCCH repetition for PDCCH transmission, DCI field values '0', '1' map to values of the first number Y10, Y11, respectively. The value of Y10 is less than the value of Y11. The value of Y11 is equal to or less than the value of Y.

In FIG. 7 (*b*), in a case where X is determined as the maximum number of PDCCH repetition for PDCCH transmission, DCI field values '00', '01', '10', '11' map to values of the first number X20, X21, X22, X23, respectively. The value of X20 is less than the value of X21. The value of X21 is less than the value of X22. The value of X22 is less than the value of X23. The value of X23 can be equal to or less than the value of X. In a case where Y is determined as the maximum number of PDCCH repetition for PDCCH transmission, DCI field values '00', '01', '10', '11' map to values of the first number Y20, Y21, Y22, Y23, respectively. The value of Y20 is less than the value of Y21. The value of Y21 is less than the value of Y22. The value of Y22 is less than the value of Y23. The value of Y23 can be equal to or less than the value of Y.

In a case where DCI does not include third information indicating the first number, the UE 102 may determine that the maximum number of PDCCH repetition is the first number. That is, the first number is indicated by the above-mentioned second information.

As above-mentioned, upon detection of a PDCCH with a configured DCI format, the UE 102 may receive/decode a corresponding PDSCHs as indicated by the DCI carried by the configured DCI format in a serving cell. To improve the PDSCH reception reliability and coverage, the UE 102 can be configured with PDSCH transmission with repetitions. Moreover, the repetitions of PDSCH transmission in different time domain can result in a lower code rate of PDSCH reception. The repetitions of PDSCH transmission imply the repetitions of PDSCH transmission of a same transport block (TB).

Upon detection of the PDCCH with a DCI format carrying DCI, the UE 102 may be scheduled to receive PDSCH scheduled by the DCI (DCI format) in the PDCCH. The UE 102 may, for example, determine, based on the DCI, a starting slot allocated for the PDSCH transmission, time domain resource allocation allocated for the PDSCH, a repetition number for the PDSCH transmission, and so on. The starting slot allocated for the PDSCH transmission means a slot where the PDSCH is transmitted by the base station 160. If the UE 102 is configured with PDSCH repetition transmission, the starting slot means a slot where the first repetition of the PDSCH transmission is transmitted by the base station 160.

The time domain resource allocation allocated for the PDSCH is provided by a time domain resource assignment field of the DCI format. The UE 102 may at least determine, based on the time domain resource assignment field, resource allocation of the PDSCH transmission in the time domain. To be more specific, the UE 102 may at least determine, based on a time domain resource assignment filed of the DCI format, a starting symbol S and a number of consecutive symbols L of the PDSCH transmission in the time domain. The number of consecutive symbols L counts from the starting symbol S within the starting slot. The resource allocation allocated for a PDSCH transmission in time domain may refer to as a PDSCH transmission occasion allocated for a PDSCH transmission. The PDSCH transmission occasion comprise at least a starting symbol S, and a number of consecutive symbols L counting from the starting symbols S within a slot. In other words, the base station 160 may transmit, to the UE 102, the PDSCH in the PDSCH transmission occasion. And the UE 102 may receive, from a base station 160, the PDSCH in the PDSCH transmission occasion.

If the UE 102 is configured with PDSCH repetition transmission, a repetition number for the PDSCH transmission is indicated by a repetition number field in the DCI format. In the present disclosure, a slot-based repetition scheme is used for the scheme of the repetition (e.g. the repetition of PDSCH, the repetition of PUSCH, the repetition of PUCCH). The PDSCH transmission occasion (the PUSCH transmission occasion, or the PUCCH transmission occasion) is based on slot level. There is only one PDSCH transmission occasion per slot for PDSCH transmission. In other words, one repetition of the PDSCH transmission is transmitted in one slot. The base station 160 may not transmit, to the UE 102, more than one repetition of the PDSCH within one slot. The UE 102 may determine, based on the repetition number field and/or a RRC parameter, a repetition number $R_{PDSCH}$ of PDSCH transmission where the RRC parameter may indicate a maximum repetition number for PDSCH transmission.

As above-mentioned, the UE 102 may determine resource allocation (time domain resource allocation, or PDSCH transmission occasion) for a PDSCH. If the UE 102 is configured with PDSCH repetition transmission, the UE 102 may apply the same resource allocation (or the same symbols allocation, or the same PDSCH monitoring occasion) across the $R_{PDSCH}$ consecutive slots. In other words, the same starting symbols S and the same number of consecutive symbols L within a slot are applied for each repetition of PDSCH transmission across the $R_{PDSCH}$ consecutive slots. Each PDSCH transmission occasion in each slot of the $R_{PDSCH}$ consecutive slots comprise at least the same starting symbol S and the same number of consecutive symbols L.

PDSCH transmission occasions for repetitions of the PDSCH transmission can be sequentially numbered from one to the $R_{PDSCH}$. For example, a PDSCH transmission occasion in the first slot of the $R_{PDSCH}$ consecutive slots corresponds to a first ($0^{th}$) PDSCH transmission occasion of the TB, a PDSCH transmission occasion in the second slot of the $R_{PDSCH}$ consecutive slots corresponds to a second ($1^{th}$) PDSCH transmission occasion of the TB, a PDSCH transmission occasion in the (n+1)th slot of the $R_{PDSCH}$ consecutive slots corresponds to a $n^{th}$ PDSCH transmission occasion of the TB, and so on. Herein, n=0, 1, ... $R_{PDSCH}-1$.

The base station 160 may repeat PDSCH transmission of a TB within each symbol allocation among each of the $R_{PDSCH}$ consecutive slots starting from the starting slot. The UE 102 may receive the repetitions of the PDSCH of the TB within each symbol allocation among each of the $R_{PDSCH}$ consecutive slots starting from the starting slot.

In an implementation of the present disclosure, a UE 102 may not receive the $R_{PDSCH}$ repetitions of the PDSCH transmission across the $R_{PDSCH}$ consecutive slots. Some PDSCH transmission occasions may be inapplicable for PDSCH transmission. In a case where the base station 160 determines a PDSCH transmission occasion as an inapplicable PDSCH transmission occasion, the base station 160 may not transmit, to the UE 102, a repetition of the PDSCH transmission in the PDSCH transmission occasion. The UE 102 may not receive, from the base station 160, a repetition of the PDSCH transmission in the PDSCH transmission occasion. In various implementations of the present disclosure, for a slot where allocated PDSCH transmission occasion for the PDSCH is determined as applicable PDSCH transmission occasion, the slot can be also called as an applicable (valid) slot for the PDSCH. In other words, for a slot where allocated PDSCH transmission occasion for the PDSCH is determined as inapplicable PDSCH transmission occasion, the slot can be also called as an inapplicable (invalid) slot for the PDSCH. That is, 'an applicable PDSCH transmission occasion' for a PDSCH may be interchanged with 'an applicable slot' for the PDSCH. 'an inapplicable PDSCH transmission occasion' for a PDSCH may be interchanged with 'an inapplicable slot' for the PDSCH.

The base station 160 may transmit, to the UE 102, a first RRC parameter (e.g. tdd-UL-DL-ConfigurationCommon, and/or the tdd-UL-DL-ConfigurationDedicated) to indicate slot format per slot over a number of slots. For example, in a case where at least one or more symbols from a PDSCH transmission occasion overlap with one or more symbols indicated (or determined) as uplink symbols by the first RRC parameter, the base station 160 and/or the UE 102 may determine the PDSCH transmission occasion as inapplicable PDSCH transmission occasion.

Additionally, the base station 160 may transmit, to the UE 102, a second RRC parameter to indicate a configuration of invalid symbols. In various implementations of the present disclosure, an invalid symbol herein implies that the UE 102 cannot perform downlink reception (e.g. the reception of repetitions of PDSCH and/or PDCCH) in the symbol. An invalid symbols herein may also imply that the UE 102 cannot perform uplink transmission (e.g. the transmission of PUCCH, PUSCH, SRS or the PRACH). An invalid symbols herein may also imply that the UE 102 cannot perform both the downlink reception and the uplink transmission in the symbol. For example, in a case where at least one or more symbols from a PDSCH transmission occasion overlap with one or more symbols indicated (or determined) as invalid symbols by the second RRC parameter, the base station 160 and/or the UE 102 may determine the PDSCH transmission occasion as inapplicable PDSCH transmission occasion.

As above-mentioned, the DCI format 2_0 can be also used to provide a slot format for each slot in a number of slots for each DL BWP or each UL BWP starting from a slot where the DCI format 2_0 is transmitted. In a case where at least one or more symbols from a PDSCH transmission occasion overlap with one or more symbols indicated (or determined) as uplink symbols by the DCI format (e.g. the DCI format 2_0), the base station 160 and/or the UE 102 may determine the PDSCH transmission occasion as inapplicable PDSCH transmission occasion.

The allocated resources in the inapplicable PDSCH transmission occasion are not available for a PDSCH transmission. The base station 160 may not transmit a repetition of a PDSCH in an inapplicable PDSCH transmission occasion, while the UE 102 may not receive the repetition of the PDSCH in the inapplicable PDSCH transmission occasion.

The base station 160 may transmit a repetition of a PDSCH in an applicable PDSCH transmission occasion, while the UE 102 may receive the repetition of the PDSCH in the applicable PDSCH transmission occasion.

The UE 102 and/or the base station 160 may determine, based on one, more or all of the first RRC parameter, the second RRC parameter, and the DCI format 2_0, whether one or more symbols in a slot are invalid symbols or not. In other words, the UE 102 and/or the base station 160 may determine, based on one, more or all of the first RRC parameter, the second RRC parameter, and the DCI format 2_0, whether a PDSCH transmission occasion is an applicable PDSCH transmission occasion or not.

Due to the existence of the inapplicable PDSCH transmission occasions, the base station 160 may not transmit the $R_{PDSCH}$ repetitions of the PDSCH over the $R_{PDSCH}$ consecutive slots. The number of repetitions of a PDSCH transmitted by the base station 160 may be smaller to the $R_{PDSCH}$ and would be an insufficient repetition number for the UE 102 to decode the PDSCH. That is, the repetitions of a PDSCH with an insufficient number would result in a consequence that the UE 102 cannot successfully decode the PDSCH. Therefore, in order to compensate for, some solutions as like to receive repetitions of PDSCH over a number of consecutive slots being equal to or larger than the $R_{PDSCH}$ would be beneficial to improve the reception performance of the PDSCH.

In an implementations of the present disclosure, the base station 160 and/or the UE 102 may determine, based on one, more or all of the first RRC parameter, the second RRC parameter, the DCI format 2_0, the time domain resource allocation field, and/or the repetition number field, a second number repetitions of PDSCH transmission over (across) a first number consecutive slots where the first number is equal to or larger than the $R_{PDSCH}$ and the second number is equal to or less than the $R_{PDSCH}$.

According to one, more or all of the first RRC parameter, the second RRC parameter, and the DCI format 2_0, the PDSCH may be transmitted with the second number repetitions, spanning the first number consecutive slots. The UE 102 and/or the base station 160 may determine the first number consecutive slots, the second number repetition, and/or a third number, sequentially for each PDSCH transmission occasion starting from the starting slot. The first number, the second number, and/or a third number start with value 0.

To be more specific, for a PDSCH transmission occasion determined as an applicable PDSCH transmission, the UE 102 and the base station 160 may increment the first number by 1, increment the second number by 1, and increment the third number by 1. For a PDSCH transmission occasion determined as an inapplicable PDSCH transmission, the UE 102 and the base station 160 may not increment the second number by 1, but may increment the first number by 1.

For an PDSCH transmission occasion determined as an inapplicable PDSCH transmission occasion by the first RRC parameter and the second RRC parameter, the UE 102 and the base station 160 may not increment the third number by 1. In other words, a transmission of the repetition of the PDSCH in the PDSCH transmission occasion is postponed by base station 160, and a reception of the repetition of the PDSCH in the PDSCH transmission occasion is postponed by UE 102. The repetition is not transmitted in the PDSCH transmission occasion, and may be postponed to a next applicable PDSCH transmission occasion.

For an PDSCH transmission occasion determined as an inapplicable PDSCH transmission occasion by the DCI format (e.g. DCI format 2_0), the UE 102 and the base station 160 may increment the third number by 1, although the base station 160 may not transmit a repetition of the PDSCH in the inapplicable PDSCH transmission occasion, and the UE 102 may not receive the repetition of the PDSCH in the inapplicable PDSCH transmission occasion. In other words, the transmission of the repetition of the PDSCH in the PDSCH transmission occasion is omitted (or dropped) by the base station 160. And the reception of the repetition of the PDSCH in the PDSCH transmission occasion is omitted (or dropped) by the UE 102. The repetition is not transmitted in the PDSCH transmission occasion, and would not be postponed to a next PDSCH transmission occasion.

Until the value of the third number reaches to the $R_{PDSCH}$, the UE 102 and the base station 160 may determine the first number and the second number, stop the counting or the increment for the first number and the second number in a PDSCH transmission occasion in the subsequent slot, and may not receive or transmit a repetition of the PDSCH in a PDSCH transmission occasion in a subsequent slot. By determining the first number and the second number according to one, more or all of the first RRC parameter, the second RRC parameter, and the DCI format 2_0, the PDSCH is transmitted with the second number repetitions, spanning the first number consecutive slots.

The counting for the first number consecutive slots includes one or more consecutive slots regardless of whether the PDSCH transmission in each of the one or more consecutive slots is an applicable PDSCH transmission occasion or an inapplicable PDSCH transmission occasion. The counting for the second number repetitions includes one or more slots in each of which the PDSCH transmission occasion is determined as an applicable PDSCH transmission occasion. The counting for the third number repetition may include one or more slots in each of which the PDSCH transmission occasion is an applicable PDSCH transmission occasion or an inapplicable PDSCH transmission determined by DCI format 2_0, and may not include one or more slots in each of which the PDSCH transmission occasion is an inapplicable PDSCH transmission determined by the first RRC parameter and the second RRC parameters.

In other words, the UE 102 and/or the base station 160 may determine (calculate or count) the first number based on the one, more or all of a repetition number $R_{PDSCH}$, the first RRC parameter, the second RRC parameter, the time domain resource allocation field, and/or the repetition number field. The UE 102 and/or the base station 160 may not determine the first number based on the DCI format 2_0. That is, the UE 102 and/or the base station 160 may determine (calculate or count) the first number at least based on a first slot format configuration but not a second slot format configuration wherein the first slot format configuration is provided by the first RRC parameter and/or the second RRC parameter, and the second slot format configuration is provided by the DCI format 2_0.

Additionally, the UE 102 and/or the base station 160 may determine (calculate or count) the second number based on the one, more or all of a repetition number $R_{PDSCH}$, the first RRC parameter, the second RRC parameter, DCI format 2_0, the time domain resource allocation field, and/or the repetition number field. That is, the UE 102 and/or the base station 160 may determine (calculate or count) the second number at least based on both a first slot format configuration and a second slot format configuration wherein the first slot format configuration is provided by the first RRC parameter and/or the second RRC parameter, and the second slot format configuration is provided by the DCI format 2_0.

Additionally, the UE 102 and/or the base station 160 may determine (calculate or count) the third number based on the one, more or all of a repetition number $R_{PDSCH}$, the first RRC parameter, the second RRC parameter, DCI format 2_0, the time domain resource allocation field, and/or the repetition number field. That is, the UE 102 and/or the base station 160 may determine (calculate or count) the third number at least based on both a first slot format configuration and a second slot format configuration wherein the first slot format configuration is provided by the first RRC parameter and/or the second RRC parameter, and the second slot format configuration is provided by the DCI format 2_0.

The UE 102 may be provided a redundancy version (RV) sequence to be applied to the repetitions of the PDSCH. The RV sequence can be a predefined sequence ('{0,2,3,1}') or configured by a RRC parameter. According to the RRC parameter, a value of a RV in the RV sequence can be set to any of the '0', '1', '2', and '3'. The UE 102 and/or the base station 160 may determine a total number of the elements (RVs) in the RV sequence according to the configured RV sequence. The RV to be applied on the $n^{th}$ PDSCH transmission occasion of the TB is determined according to the RV sequence and a value of $rv_{id}$ indicated by the DCI format scheduling the PDSCH. The $rv_{id}$ is applied to the $0^{th}$ PDSCH transmission occasion of the TB. Next, the values after the value of $rv_{id}$ in the RV sequence are sequentially applied to subsequent each $n^{th}$ PDSCH transmission occasion of the TB.

In an example, the RVs in the RV sequence are sequentially applied on the $n^{th}$ PDSCH transmission occasion of the TB where n is counted only considering the applicable PDSCH transmission occasions. That is, for an PDSCH transmission occasion determined as an inapplicable PDSCH transmission occasion by the first RRC parameter, the second RRC parameter, and/or the DCI format 2_0, n is not counted and the RV is not applied.

Additionally or alternatively, the RVs in the RV sequence are sequentially applied on the $n^{th}$ PDSCH transmission occasion of the TB where n is counted only considering the applicable PDSCH transmission occasions and the inapplicable PDSCH transmissions determined by the DCI format 2_0. That is, for an PDSCH transmission occasion determined as an inapplicable PDSCH transmission occasion by the first RRC parameter and/or the second RRC parameter, n is not counted and the RV is not applied. In other words, for an PDSCH transmission occasion determined as an inapplicable PDSCH transmission occasion by the DCI format 2_0, n is counted and the RV is applied on the inapplicable PDSCH transmission occasion. However, although the RV is applied on the inapplicable PDSCH transmission occasion, the base station 160 may not transmit a repetition of the PDSCH in the inapplicable PDSCH transmission occasion. That is, the RVs in the RV sequence are sequentially applied on multiple PDSCH transmission occasions of the TB wherein in a case that one or more symbols of a PDSCH transmission occasion overlap with one or more symbols indicated as uplink symbol by the RRC parameter (e.g. the first RRC parameter and/or the second RRC parameter), the PDSCH transmission occasion is not included as the multiple PDSCH transmission occasions, and in a case that one or more symbols of a PDSCH transmission occasion overlap with one or more symbols indicated as uplink symbol by the DCI format 2_0, the PDSCH transmission occasion is included as the multiple PDSCH transmission occasions.

Additionally or alternatively, the RVs in the RV sequence are sequentially applied on the $n^{th}$ PDSCH transmission occasion of the TB where n is counted considering both the applicable PDSCH transmission occasions and the inapplicable PDSCH transmissions. That is, the RVs in the RV sequence are sequentially applied on the consecutive PDSCH transmission occasions of the TB regardless of whether the PDSCH transmission occasion is an applicable PDSCH transmission occasion or an inapplicable PDSCH transmission occasion.

In an example, the UE 102 may be configured a RRC parameter indicating a number of PDSCH repetition been applied with a same RV. That is, a same RV in the RV sequence is applied on a number of consecutive PDSCH transmission occasions of the TB. Whether a PDSCH transmission occasions is counted in the number is based on the determination illustrated above.

Figure 8:
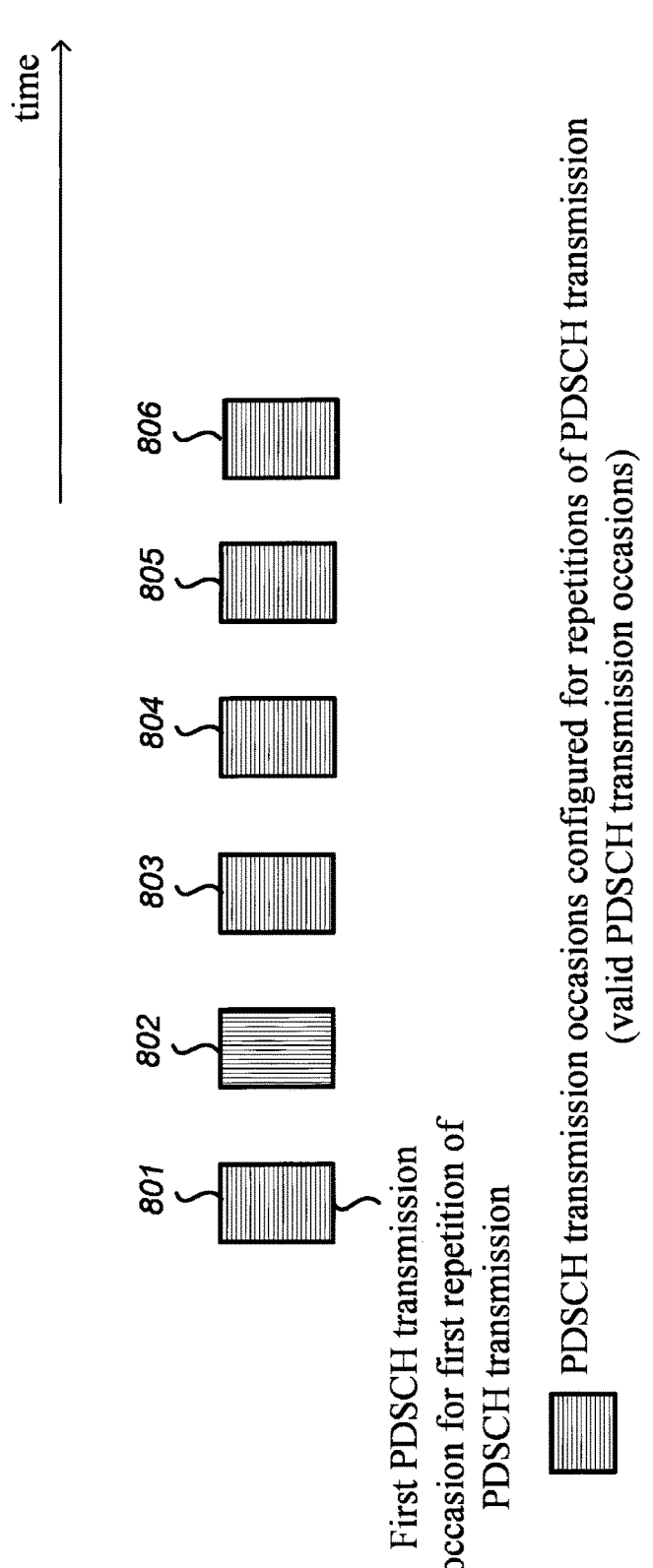
FIG. 8 illustrates one example 800 for determining PDSCH repetition by a UE 102.

FIG. 8 illustrates one example 800 for determining PDSCH repetition by a UE 102.

As above-mentioned, upon detection of a PDCCH with a DCI format carrying DCI, the UE 102 may be scheduled to receive a PDSCH scheduled by the DCI in the PDCCH. Moreover, the UE 102 may determine, based on the DCI, a starting slot, time domain resource allocation (i.e. the starting symbol S and a number of consecutive symbols L), a repetition number of PDSCH transmission $R_{PDSCH}$ for the PDSCH. In the FIG. 8, the repetition number of PDSCH transmission $R_{PDSCH}$=4 is assumed for illustration. The UE 102 may determine, based on the DCI, a first PDSCH transmission occasion 801 which is located in the starting slot. The starting symbol of the first PDSCH transmission occasion 801 is the starting symbols S, and the number of consecutive symbols of the first PDSCH transmission occasion 801 is the number of consecutive symbols L.

The UE 102 may determine the subsequent PDSCH transmission occasions 802, 803, and 804 for the reception of PDSCH repetition by applying the same symbol allocation for the PDSCH transmission occasion 801 to these PDSCH transmission occasions. That is, the $R_{PDSCH}$=4 PDSCH transmission occasions have same starting symbols S and the same number of consecutive symbols L. The $R_{PDSCH}$=4 PDSCH transmission occasions are across the $R_{PDSCH}$=4 consecutive slots where each of the $R_{PDSCH}$=4 consecutive slots has one PDSCH transmission occasion.

In FIG. 8, the PDSCH transmission occasions 801, 803, and 804 are determined as applicable PDSCH transmission occasions, while the PDSCH transmission occasions 802 is determined as an inapplicable PDSCH transmission.

In an example, the PDSCH transmission occasion 802 is determined as an inapplicable PDSCH transmission by the first RRC parameter and the second RRC parameter. The UE 102 and base station 160 may determine the first number, the second number, and the third number in the first PDSCH transmission occasion 801. Given the 801 is an applicable PDSCH transmission occasion, the UE 102 and the base station 160 increment the first number by 1, increment the second number by 1, and increment the third number by 1. Sequentially, UE 102 and base station 160 may determine the first number, the second number, and the third number in the PDSCH transmission occasion 802. Given the 802 is an inapplicable PDSCH transmission occasion, the UE 102 and the base station 160 increment the first number by 1, and do not increment the second number by 1, and do not increment the third number by 1. By 802, the values of the first, the second and the third number are 2, 1, 1, respectively.

Sequentially, UE 102 and base station 160 may determine the first number, the second number, and the third number in the PDSCH transmission occasion 803. Given the 803 is an applicable PDSCH transmission occasion, the UE 102 and the base station 160 increment the first number by 1, increment the second number by 1, and increment the third number by 1. By 803, the values of the first, the second and the third number are 3, 2, 2, respectively.

Sequentially, UE 102 and base station 160 may determine the first number, the second number, and the third number in the PDSCH transmission occasion 804. Given the 804 is an applicable PDSCH transmission occasion, the UE 102 and the base station 160 increment the first number by 1, increment the second number by 1, and increment the third number by 1. By 804, the values of the first, the second and the third number are 4, 3, 3, respectively.

Since the value of the third number does not reach the $R_{PDSCH}$, the UE 102 and the base station 160 may determine the first number, the second number, and the third number in the PDSCH transmission occasion 805. Here, the 805 is considered as an applicable PDSCH transmission occasion. The UE 102 and the base station 160 increment the first number by 1, increment the second number by 1, and increment the third number by 1. By 805, the values of the first, the second and the third number are 5, 4, 4, respectively. Given the value of the third number reaches to the $R_{PDSCH}$=4, the UE 102 and the base station 160 may stop the counting or the increment for the first number and the second number in a subsequent PDSCH transmission occasion (806). The PDSCH is transmitted with the 4 repetitions, spanning the 5 consecutive slots.

In an example, the PDSCH transmission occasion 802 is determined as an inapplicable PDSCH transmission by DCI format 2_0. The UE 102 and base station 160 may determine the first number, the second number, and the third number in the first PDSCH transmission occasion 801. Given the 801 is an applicable PDSCH transmission occasion, the UE 102 and the base station 160 increment the first number by 1, increment the second number by 1, and increment the third number by 1. Sequentially, UE 102 and base station 160 may determine the first number, the second number, and the third number in the PDSCH transmission occasion 802. Given the 802 herein is an inapplicable PDSCH transmission occasion, the UE 102 and the base station 160 increment the first number by 1, increment the third number by 1, and do not increment the second number by 1. By 802, the values of the first, the second and the third number are 2, 1, 2, respectively.

Sequentially, UE 102 and base station 160 may determine the first number, the second number, and the third number in the PDSCH transmission occasion 803. Given the 803 is an applicable PDSCH transmission occasion, the UE 102 and the base station 160 increment the first number by 1, increment the second number by 1, and increment the third number by 1. By 803, the values of the first, the second and the third number are 3, 2, 3, respectively.

Sequentially, UE 102 and base station 160 may determine the first number, the second number, and the third number in the PDSCH transmission occasion 804. Given the 804 is an applicable PDSCH transmission occasion, the UE 102 and the base station 160 increment the first number by 1, increment the second number by 1, and increment the third number by 1. By 804, the values of the first, the second and the third number are 4, 3, 4, respectively. Given the value of the third number reaches to the $R_{PDSCH}$=4, the UE 102 and the base station 160 may stop the counting or the increment for the first number and the second number in a subsequent PDSCH transmission occasion (805). The PDSCH is transmitted with the 3 repetitions, spanning the 4 consecutive slots.

FIG. 9 is a flow diagram illustrating one implementation of a method 900 for determining PDSCH repetition by a UE 102.

In the implementation of the present disclosure, a UE 102 may receive 902, from a base station 160, PDCCH with a first DCI format scheduling PDSCH repetitions. In 902, the UE 102 may further receive a first RRC parameter (e.g. tdd-UL-DL-ConfigurationCommon, and/or the tdd-UL-DL-ConfigurationDedicated) to indicate slot format per slot over a number of slots. In 902, the UE 102 may further receive a second RRC parameter to indicate a configuration of invalid symbols. A repetition of the PDSCH transmission is not transmitted in the invalid symbols provided by the second RRC parameter. In 902, the UE may further receive a second DCI format (e.g. the DCI format 2_0) to provide a slot format for each slot in a number of slots for each DL BWP or each UL BWP starting from the slot where the UE 102 detects the second DCI format.

In 904, the UE 102 may determine, based on the received first DCI format, multiple PDSCH transmission occasions for reception of PDSCH repetitions over multiple consecutive slots. Each PDSCH transmission occasion in each slot of the multiple consecutive slots comprises at least the same starting symbol S and the same number of consecutive symbols L, which are determined based on a time domain resource allocation field in the first DCI format. That is, same time domain resource allocation are applied to the multiple PDSCH transmission occasions over the multiple consecutive slots.

In 906, the UE 102 may determine, based on one, more or all of the first RRC parameter, the second RRC parameter, and/or the second DCI format, whether each PDSCH transmission occasion among the multiple PDSCH transmission occasions is applicable for a repetition of the PDSCH or not. The specific determination of the applicable and/or inapplicable PDSCH transmission occasion had been illustrated as above-mentioned.

In 908, the UE 102 may further determine, based on one, more or all of the first RRC parameter, the second RRC parameter, and/or the second DCI format, whether to postpone or omit a reception of a repetition of the PDSCH in an inapplicable transmission occasion. The base station 160 may transmit one PDSCH repetition in an applicable PDSCH transmission occasion. The UE 102 may receive the one PDSCH repetition in the applicable PDSCH transmission occasion. However, the base station 160 may not transmit one PDSCH repetition in an inapplicable PDSCH transmission occasion, and the UE 102 may not receive the one PDSCH repetition in the inapplicable PDSCH transmission occasion.

For example, in a first case where one or more symbols from a first PDSCH transmission occasion overlap with one or more symbols indicated as uplink symbol by the RRC parameters (e.g. the first RRC parameter and/or the second RRC parameter), a reception of a PDSCH repetition in the first PDSCH transmission occasion is postponed. In this case, the base station 160 may postpone the transmission of the repetition of the PDSCH to a next applicable (or available) PDSCH transmission occasion. While the UE may postpone the reception of the repetition of the PDSCH to the next applicable (or available) PDSCH transmission occasion. Additionally or alternatively, the RRC parameters herein may only refer to the tdd-UL-DL-ConfigurationCommon and/or the second RRC parameter, and not refer to the tdd-UL-DL-ConfigurationDedicated. That is, in a case where one or more symbols of a PDSCH transmission occasion overlap with one or more symbols indicated as uplink symbol by the tdd-UL-DL-ConfigurationDedicated, a reception of a repetition of the PDSCH in the PDSCH transmission occasion is omitted.

In a second case where one or more symbols from a second PDSCH transmission occasion overlap with one or more symbols indicated as uplink symbol by the DCI format 2_0, a reception of a PDSCH repetition in the second PDSCH transmission occasion is omitted.

FIG. 10 is a flow diagram illustrating another implementation of a method 1000 for determining PDSCH repetition by a UE 102.

In the implementation of the present disclosure, a UE 102 may receive 1002, from a base station 160, PDCCH with a first DCI format scheduling PDSCH repetitions. In 1002, the UE 102 may further receive a first RRC parameter (e.g. tdd-UL-DL-ConfigurationCommon, and/or the tdd-UL-DL-ConfigurationDedicated) to indicate slot format per slot over a number of slots. In 1002, the UE 102 may further receive a second RRC parameter to indicate a configuration of invalid symbols. A repetition of the PDSCH transmission is not transmitted in the invalid symbols provided by the second RRC parameter. In 1002, the UE may further receive a second DCI format (e.g. the DCI format 2_0) to provide a slot format for each slot in a number of slots for each DL BWP or each UL BWP starting from the slot where the UE 102 detects the second DCI format.

In 1004, the UE 102 may determine, based on one, more or all of the received first DCI format, the first RRC parameter, and/or the second RRC parameter, multiple PDSCH transmission occasions for reception of the PDSCH repetitions over multiple consecutive slots. Each PDSCH transmission occasion in each slot of the multiple consecutive slots comprises at least the same starting symbol S and the same number of consecutive symbols L, which are determined based on a time domain resource allocation field in the first DCI format. That is, same time domain resource allocation are applied to the multiple PDSCH transmission occasions over the multiple consecutive slots.

In 1004, the UE 102 may determine, based on one, more or all of the received first DCI format, the first RRC parameter, and/or the second RRC parameter, multiple PDSCH transmission occasions for reception of the PDSCH repetitions over multiple consecutive slots wherein in a case that one or more symbols of a PDSCH transmission occasion overlap with one or more symbols indicated as uplink (or the invalid) symbol by the RRC parameter (e.g. the first RRC parameter and/or the second RRC parameter), the PDSCH transmission occasion is not included as the multiple PDSCH transmission occasions for reception of the PDSCH repetitions. In the case that one or more symbols of a PDSCH transmission occasion overlap with one or more symbols indicated as uplink (or the invalid) symbol by the RRC parameter (e.g. the first RRC parameter and/or the second RRC parameter), the UE 102 and the base station 160 may consider the PDSCH transmission occasion as invalid, not consider the PDSCH transmission occasion as one of the multiple PDSCH transmission occasions. A slot where the PDSCH transmission occasion is considered as invalid may also refer to as 'a invalid slot' for PDSCH transmission with repetitions. In this case, the UE 102 and the base station 160 may postpone a PDSCH transmission occasion of the multiple PDSCH transmission occasions to a next valid PDSCH transmission occasion.

In other words, any symbols of each PDSCH transmission occasion among the multiple PDSCH transmission occasions for reception of the PDSCH repetitions do not overlap with any symbols indicated as uplink (or the invalid) symbols by the RRC parameter. The UE 102 and the base station may include a PDSCH transmission occasion as the multiple PDSCH transmission occasion if any symbols of the PDSCH transmission occasion do not overlap with any symbols indicated as uplink symbols by the RRC parameter.

The PDSCH is transmitted with a second number repetitions in the second number of the multiple PDSCH transmission occasions spanning a first number of consecutive slots wherein the second number is equal to or smaller than the first number and one or more invalid slots for PDSCH transmission are not included in the multiple PDSCH transmission occasions. That is, one or more invalid slots are not counted (included) in the second number. In the meantime, the one or more invalid slots are counted in the first number.

In 1006, the UE 102 may determine, based on the second DCI format, whether to receive or omit a reception of a repetition of the PDSCH repetitions in an PDSCH transmission occasion among the multiple PDSCH transmission occasions. The base station 160 may determine, based on the second DCI format, whether to transmit or omit a transmission of a repetition of the PDSCH repetitions in an PDSCH transmission occasion among the multiple PDSCH transmission occasions. In a case where one or more symbols of an PDSCH transmission occasion overlap with one or more symbols indicated as uplink symbol by the second DCI format, the UE 102 may omit a reception of a repetition among the PDSCH repetitions in the PDSCH transmission occasion. In another case where any symbols of an PDSCH transmission occasion overlap with any symbols indicated as uplink symbol by the second DCI format, the UE 102 may receive a reception of a repetition among the PDSCH repetitions in the PDSCH transmission occasion.

Additionally, the PDSCH is transmitted with the second number repetitions in the third number of the multiple transmission occasions spanning a first number of consecutive slots wherein the second number and the third number are equal to or smaller than the first number and one or more invalid slots for PDSCH transmission are not included in the multiple PDSCH transmission occasions and the second number repetitions. That is, one or more invalid slots are not counted (included) in the second number and the third number. In the meantime, the one or more invalid slots are counted in the first number. Moreover, regarding the counting of the second number, for a PDSCH transmission occasion in the third number of the multiple transmission occasions, in a case where one or more symbols of the PDSCH transmission occasion overlap with one or more symbols indicated as uplink symbol by the second DCI format, the PDSCH transmission occasion is not included in the second number, i.e. the second number may be equal to or smaller than the third number.

Additionally or alternatively, in some cases, one PDSCH (i.e. one repetition of a PDSCH) can be transmitted in one or more consecutive PDSCH transmission occasions among the multiple PDSCH transmission. That is, the allocated resource in one or more consecutive PDSCH transmission occasions can be used for a transmission of one PDSCH. The number of the one or more consecutive PDSCH transmission occasions can be indicated or determined by a RRC parameter and/or a DCI field included in a DCI format scheduling the PDSCH repetitions.

Therefore, through the above-mentioned solutions, for the UE 102, a reliable PDSCH reception can be achieved and the coverage for the PDSCH can be enhanced as well.

The various implementations of the present disclosure described for repetitions of a PDSCH above can be equally apply to repetitions of a PDCCH by applying PDCCH instead of PDSCH. For example, terms 'PDSCH transmission occasion', 'PDSCH repetition' can be substituted for terms 'PDCCH transmission (or monitoring) occasion', 'PDCCH repetition', respectively. One difference from the PDSCH repetition may be that one or more than one PDCCH transmission (or monitoring) occasions can be located within one slot. That is, one or more than one repetition of the PDCCH can be transmitted in one slot.

Additionally, the various implementations of the present disclosure described for repetitions of a PDSCH (or the Redundancy Version for each PDSCH transmission occasion) above can be equally apply to the repetitions of a PUSCH (or repetitions of a PUCCH).

For example, in an implementations of the present disclosure, the base station 160 may transmit, to the UE 102, a first RRC parameter (e.g. tdd-UL-DL-ConfigurationCommon, and/or the tdd-UL-DL-ConfigurationDedicated) to indicate slot format per slot over a number of slots. For example, in a case where at least one or more symbols from a PUSCH (or PUCCH) transmission occasion overlap with one or more symbols indicated (or determined) as downlink symbols by the first RRC parameter, the base station 160 and/or the UE 102 may determine the PUSCH (or PUCCH) transmission occasion as inapplicable (or PUCCH) transmission occasion.

The base station 160 may transmit, to the UE 102, a second RRC parameter to indicate a configuration of invalid symbols where an invalid symbol herein implies that the UE 102 cannot perform uplink transmission (e.g. the transmission of repetitions of PUSCH and/or PUCCH) in the symbol. A repetition of the PUSCH (or PUCCH) transmission is not transmitted in the invalid symbols provided by the second RRC parameter.

A UE 102 may receive, from a base station 160, PDCCH with a first DCI format scheduling PUSCH repetitions or a first DCI format scheduling PDSCH corresponding to PUCCH repetitions transmission. A repetition number of PUSCH (PUCCH) transmission can be determined based on one, more or all of a DCI field in the first DCI format, a RRC parameter indicating a maximum repetition number for transmission, a MAC CE of the corresponding PDSCH.

The base station 160 may transmit, to the UE 102, a second DCI format (DCI format 2_0) to provide a slot format for each slot in a number of slots for each DL BWP or each UL BWP starting from the slot where the UE 102 detects the second DCI format.

The base station 160 and/or the UE 102 may determine, based on one, more or all of the received first DCI format, the first RRC parameter, and/or the second RRC parameter, multiple PUSCH (or PUCCH) transmission occasions for reception of PUSCH (or PUCCH) repetitions over multiple consecutive slots. Each PUSCH (or PUCCH) transmission occasion in each slot of the multiple consecutive slots comprise at least the same starting symbol S and the same number of consecutive symbols L.

The UE 102 may determine, based on one, more or all of the received first DCI format, the first RRC parameter, and/or the second RRC parameter, multiple PUSCH (or PUCCH) transmission occasions for transmission of the PUSCH (or PUCCH) repetitions over multiple consecutive slots wherein in a case that one or more symbols of a PUSCH (or PUCCH) transmission occasion overlap with one or more symbols indicated as downlink (or the invalid) symbol by the RRC parameter (e.g. the first RRC parameter and/or the second RRC parameter), the PUSCH (or PUCCH) transmission occasion is not included as the multiple PUSCH (or PUCCH) transmission occasions for transmission of the PUSCH (or PUCCH) repetitions. In the case that one or more symbols of a PUSCH (or PUCCH) transmission occasion overlap with one or more symbols indicated as downlink (or the invalid) symbol by the RRC parameter (e.g. the first RRC parameter and/or the second RRC parameter), the UE 102 and the base station 160 may consider the PUSCH (or PUCCH) transmission occasion as invalid, not consider the PUSCH (or PUCCH) transmission occasion as one of the multiple PUSCH (or PUCCH) transmission occasions. A slot where the PUSCH (or PUCCH) transmission occasion is considered as invalid may also refer to as 'a invalid slot' for PUSCH (or PUCCH) transmission with repetitions. In this case, the UE 102 and the base station 160 may postpone a PUSCH (or PUCCH) transmission occasion of the multiple PUSCH (or PUCCH) transmission occasions to a next valid PUSCH (or PUCCH) transmission occasion.

In other words, any symbols of each PUSCH (or PUCCH) transmission occasion among the multiple PUSCH (or PUCCH) transmission occasions for transmission of the PUSCH (or PUCCH) repetitions do not overlap with any symbols indicated as downlink (or the invalid) symbols by the RRC parameter. The UE 102 and the base station may include a PUSCH (or PUCCH) transmission occasion as the multiple PUSCH (or PUCCH) transmission occasion if any symbols of the PUSCH (or PUCCH) transmission occasion do not overlap with any symbols indicated as downlink symbols by the RRC parameter.

The PUSCH (or PUCCH) is transmitted with a second number repetitions in the second number of the multiple PUSCH (or PUCCH) transmission occasions spanning a first number of consecutive slots wherein the second number is equal to or smaller than the first number and one or more invalid slots for PUSCH (or PUCCH) transmission are not included in the multiple PUSCH (or PUCCH) transmission occasions. That is, one or more invalid slots are not counted (included) in the second number. In the meantime, the one or more invalid slots are counted in the first number.

The UE 102 may determine, based on the second DCI format, whether to transmit or omit a transmission of a repetition of the PUSCH (or PUCCH) repetitions in an PUSCH (or PUCCH) transmission occasion among the multiple PUSCH (or PUCCH) transmission occasions. In a case where one or more symbols of an PUSCH (or PUCCH) transmission occasion overlap with one or more symbols indicated as downlink symbol by the second DCI format, the UE 102 may omit a transmission of a repetition among the PUSCH (or PUCCH) repetitions in the PUSCH (or PUCCH) transmission occasion. In another case where any symbols of an PUSCH (or PUCCH) transmission occasion overlap with any symbols indicated as downlink symbol by the second DCI format, the UE 102 may transmit a repetition among the PUSCH (or PUCCH) repetitions in the PUSCH (or PUCCH) transmission occasion.

Additionally or alternatively, the base station 160 and/or the UE 102 may determine, based on one, more or all of the first RRC parameter, the second RRC parameter, and/or second DCI format, whether each PUSCH (or PUCCH) transmission occasion among the multiple PUSCH (or PUCCH) transmission occasions is applicable for a repetition of the PUSCH (or PUCCH) or not. The specific determination of the applicable and/or inapplicable PUSCH (or PUCCH) transmission occasion had been illustrated as above-mentioned.

Additionally or alternatively, the UE 102 may further determine, based on one, more or all of the first RRC parameter, the second RRC parameter, and/or the second DCI format, whether to postpone or omit a transmission of a repetition of the PUSCH (PUCCH) in an inapplicable transmission occasion. The UE 102 may transmit one PUSCH (or PUCCH) repetition in an applicable PUSCH (or PUCCH) transmission occasion. The base station 160 may receive the one PUSCH (or PUCCH) repetition in the applicable PUSCH (PUCCH) transmission occasion.

For example, in a first case where one or more symbols from a first PUSCH (PUCCH) transmission occasion overlap with one or more symbols indicated as downlink symbol by RRC parameters (e.g. the first RRC parameter and/or the second RRC parameter), a transmission of a PUSCH (or PUCCH) repetition in the first PUSCH (or PUCCH) transmission occasion is postponed. In this case, the UE 102 may postpone the transmission of the repetition of the PUSCH (or PUCCH) transmission to a next applicable (or available) PUSCH (or PUCCH) transmission occasion. While the base station 160 may postpone the reception of the repetition of the PUSCH (or PUCCH) to the next applicable PUSCH (or PUCCH) transmission occasion. Additionally or alternatively, the RRC parameters herein may only refer to the tdd-UL-DL-ConfigurationCommon and/or the second RRC parameter, and not refer to the tdd-UL-DL-Configuration-Dedicated. That is, in a case where one or more symbols from a PUSCH (or PUCCH) transmission occasion overlap with one or more symbols indicated as downlink symbol by the tdd-UL-DL-ConfigurationDedicated, a transmission of a PUSCH (PUCCH) repetition in the PUSCH (or PUCCH) transmission occasion is omitted.

In a second case where one or more symbols from a second PUSCH (or PUCCH) transmission occasion overlap with one or more symbols indicated as downlink symbol by the DCI format 2_0, a transmission of a PUSCH (or PUCCH) repetition in the second PUSCH (or PUCCH) transmission occasion is omitted.

Therefore, through the above-mentioned solutions, for the base station, a reliable PUSCH reception and a reliable PUCCH reception can be achieved and the coverage for the PUSCH and the PUCCH can be enhanced as well.

Figure 11:
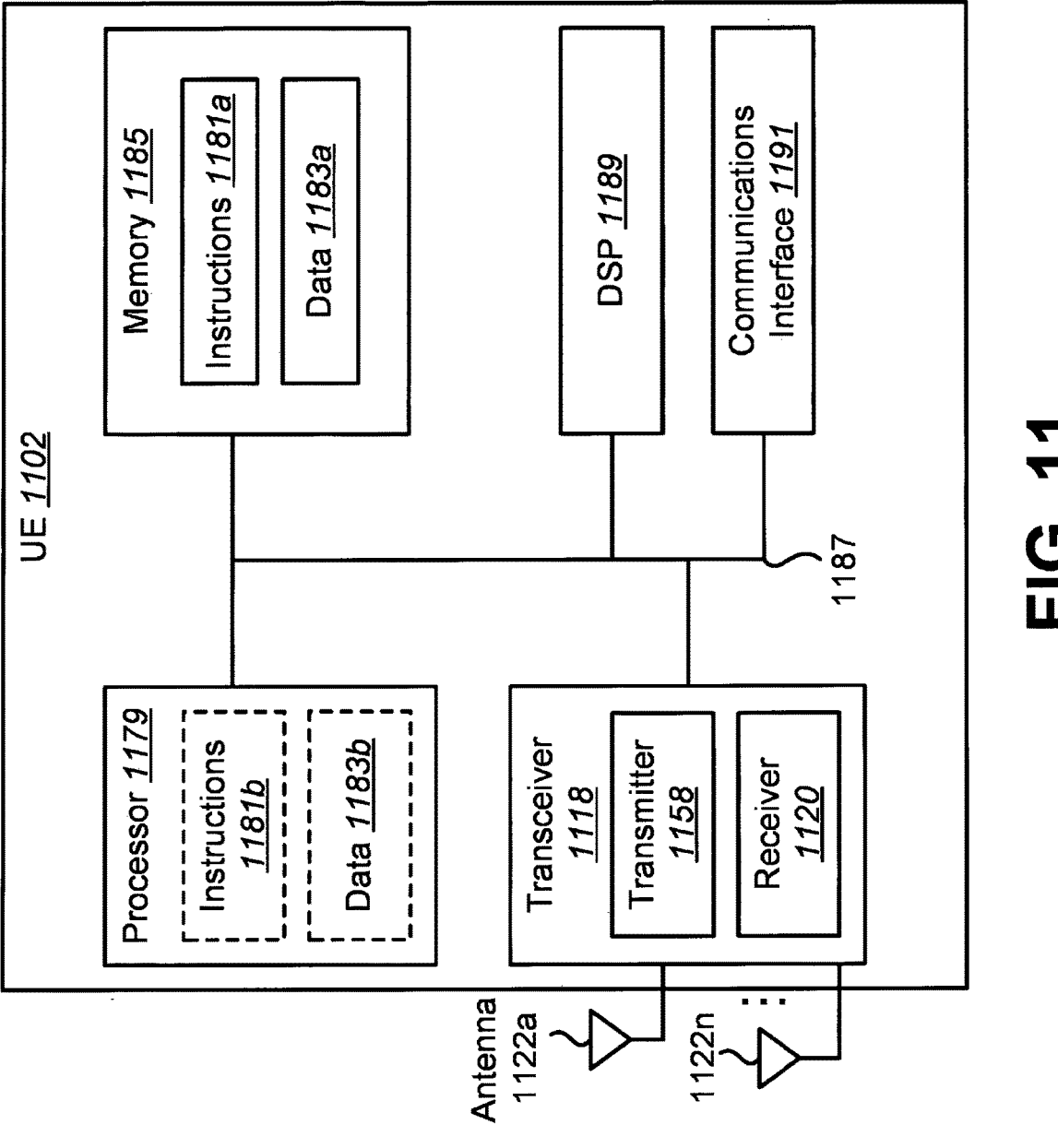
FIG. 11 illustrates various components that may be utilized in a UE.

FIG. 11 illustrates various components that may be utilized in a UE 1102. The UE 1102 (UE 102) described in connection with FIG. 11 may be implemented in accordance with the UE 102 described in connection with FIG. 1. The UE 1102 includes a processor 1181 that controls operation of the UE 1102. The processor 1181 may also be referred to as a central processing unit (CPU). Memory 1187, which may include read-only memory (ROM), random access memory (RAM), a combination of the two or any type of device that may store information, provides instructions 1183*a* and data 1185*a* to the processor 1181. A portion of the memory 1187 may also include non-volatile random access memory (NVRAM). Instructions 1183*b* and data 1185*b* may also reside in the processor 1181. Instructions 1183*b* and/or data 1185*b* loaded into the processor 1181 may also include instructions 1183*a* and/or data 1185*a* from memory 1187 that were loaded for execution or processing by the processor 1181. The instructions 1183*b* may be executed by the processor 1181 to implement one or more of the methods 200 described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122*a-n* are attached to the housing and electrically coupled to the transceiver 1118.

The various components of the UE 1102 are coupled together by a bus system 1189, which may include a power bus, a control signal bus and a status signal bus, in addition to a data bus. However, for the sake of clarity, the various buses are illustrated in FIG. 11 as the bus system 1189. The UE 1102 may also include a digital signal processor (DSP) 1191 for use in processing signals. The UE 1102 may also include a communications interface 1193 that provides user access to the functions of the UE 1102. The UE 1102 illustrated in FIG. 11 is a functional block diagram rather than a listing of specific components.

Figure 12:
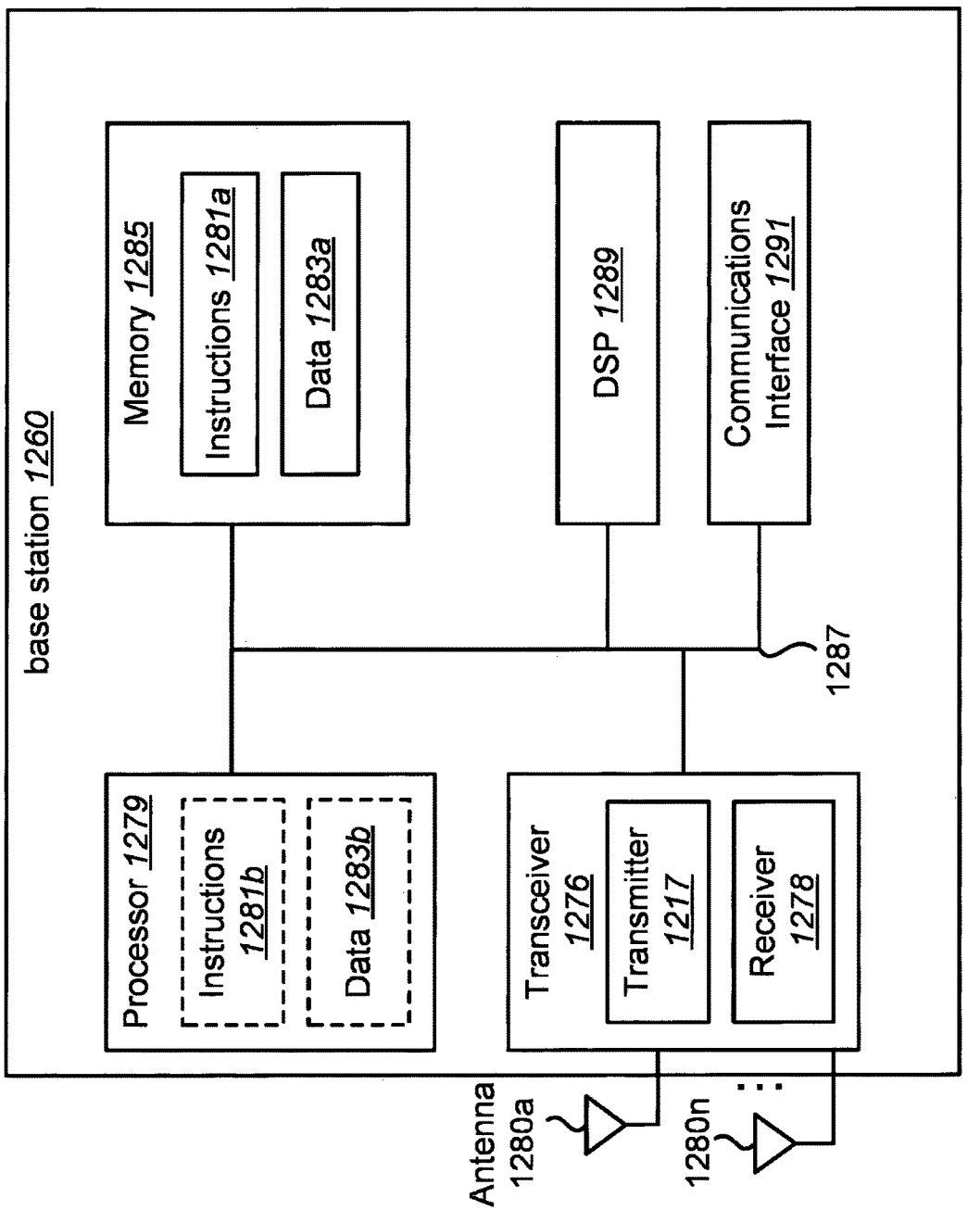
FIG. 12 illustrates various components that may be utilized in a base station.

FIG. 12 illustrates various components that may be utilized in a base station 1260. The base station 1260 described in connection with FIG. 12 may be implemented in accordance with the base station 160 described in connection with FIG. 1. The base station 1260 includes a processor 1281 that controls operation of the base station 1260. The processor 1281 may also be referred to as a central processing unit (CPU). Memory 1287, which may include read-only memory (ROM), random access memory (RAM), a combination of the two or any type of device that may store information, provides instructions 1283*a* and data 1285*a* to the processor 1281. A portion of the memory 1287 may also include non-volatile random access memory (NVRAM). Instructions 1283*b* and data 1285*b* may also reside in the processor 1281. Instructions 1283*b* and/or data 1285*b* loaded into the processor 1281 may also include instructions 1283*a* and/or data 1285*a* from memory 1287 that were loaded for execution or processing by the processor 1281. The instructions 1283*b* may be executed by the processor 1281 to implement one or more of the methods 300 described above.

The base station 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280*a-n* are attached to the housing and electrically coupled to the transceiver 1276.

The various components of the base station 1260 are coupled together by a bus system 1289, which may include a power bus, a control signal bus and a status signal bus, in addition to a data bus. However, for the sake of clarity, the various buses are illustrated in FIG. 12 as the bus system 1289. The base station 1260 may also include a digital signal processor (DSP) 1291 for use in processing signals. The base station 1260 may also include a communications interface 1293 that provides user access to the functions of the base station 1260. The base station 1260 illustrated in FIG. 12 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using circuitry, a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A user equipment (UE), comprising:

reception circuitry configured to receive, from a base station:

a radio resource control (RRC) parameter indicating a slot format per slot, and a first downlink control information (DCI) format scheduling a physical uplink shared channel (PUSCH) with a first number of repetitions in the first number of slots; and control circuitry configured to determine, based on the RRC parameter, whether to count a slot in the first number of the slots, wherein:

in a case that at least one symbol of a PUSCH symbol allocation in a slot overlaps with one or more symbols indicated as a downlink symbol by the RRC parameter, the slot is not counted in the first number of the slots, and the PUSCH symbol allocation comprising a starting symbol and a number of consecutive symbols in a slot is determined based on a time domain resource allocation field of the first DCI format.

2. The UE of claim 1, wherein in the case that the at least one symbol of the PUSCH symbol allocation in the slot overlaps with the one or more symbols indicated as the downlink symbol by the RRC parameter, the control circuitry is further configured to:

determine the slot as an unavailable slot for a PUSCH transmission, and postpone the PUSCH transmission to a next available slot.

3. A base station, comprising:

transmission circuitry configured to transmit, to a user equipment (UE):

a radio resource control (RRC) parameter indicating a slot format per slot, and a first downlink control information (DCI) format scheduling a physical uplink shared channel (PUSCH) with a first number of repetitions in the first number of slots; and control circuitry configured to determine, based on the RRC parameter, whether to count a slot in the first number of the slots, wherein:

in a case that at least one symbol of a PUSCH symbol allocation in a slot overlaps with one or more symbols indicated as a downlink symbol by the RRC parameter, the slot is not counted in the first number of the slots, and the PUSCH symbol allocation comprising a starting symbol and a number of consecutive symbols in a slot is determined based on a time domain resource allocation field of the first DCI format.

4. The base station of claim 3, wherein in the case that the at least one symbol of the PUSCH symbol allocation in the slot overlaps with the one or more symbols indicated as the downlink symbol by the RRC parameter, the control circuitry is further configured to:

determine the slot as an unavailable slot for a PUSCH transmission, and postpone the PUSCH transmission to a next available slot.

5. A method performed by a user equipment (UE), the method comprising:

receiving, from a base station, a radio resource control (RRC) parameter indicating a slot format per slot, and a first downlink control information (DCI) format scheduling a physical uplink shared channel (PUSCH) with a first number of repetitions in the first number of slots; and determining, based on the RRC parameter, whether to count a slot in the first number of the slots, wherein:

in a case that at least one symbol of a PUSCH symbol allocation in a slot overlaps with one or more symbols indicated as a downlink symbol by the RRC parameter, the slot is not counted in the first number of the slots, and the PUSCH symbol allocation comprising a starting symbol and a number of consecutive symbols in a slot is determined based on a time domain resource allocation field of the first DCI format.

\* \* \* \* \*